United States Patent [19]

Cowe et al.

[11] Patent Number: 5,671,362

[45] Date of Patent: Sep. 23, 1997

[54] MATERIALS MONITORING SYSTEMS, MATERIALS MANAGEMENT SYSTEMS AND RELATED METHODS

[76] Inventors: Alan B. Cowe, 12 Towpath Rd., Denville, N.J. 07834; Roland Werres, 27 Chesterfield Dr., Warren, N.J. 07059

[21] Appl. No.: 417,745

[22] Filed: Apr. 4, 1995

[51] Int. Cl.$^6$ .................................................. G06F 153/00
[52] U.S. Cl. ........................... 395/228; 395/222; 340/568; 340/825.54; 340/825.36
[58] Field of Search .................................... 364/401, 403, 364/406, 464.02, 478.02; 235/380–385; 340/825.32, 825.35, 825.55, 568, 825.49, 85.34, 825.36, 286.08, 286.07, 286.09, 825.54; 395/228, 222

[56] References Cited

U.S. PATENT DOCUMENTS

| | | | |
|---|---|---|---|
| 4,419,734 | 12/1983 | Wolfson et al. | 364/567 |
| 4,796,209 | 1/1989 | Burk | 364/403 |
| 4,845,492 | 7/1989 | Cobb et al. | 340/825.35 |
| 4,881,061 | 11/1989 | Chambers | 340/568 |
| 4,961,533 | 10/1990 | Teller et al. | 364/403 |
| 5,188,020 | 2/1993 | Buchnag | 99/468 |
| 5,260,690 | 11/1993 | Mann et al. | 340/825.31 |
| 5,303,844 | 4/1994 | Muehlberger | 235/381 |
| 5,313,393 | 5/1994 | Varley et al. | 364/403 |
| 5,442,344 | 8/1995 | Merkle et al. | 340/825.35 |
| 5,448,226 | 9/1995 | Failing, Jr. et al. | 340/325.35 |
| 5,455,409 | 10/1995 | Smith et al. | 235/385 |

*Primary Examiner*—Gail O. Hayes
*Assistant Examiner*—Frantzy Poinvil
*Attorney, Agent, or Firm*—Handal & Morofsky

[57] ABSTRACT

An inventory monitoring system which is operative at a point of storage automatically to sense the presence and number of materials or product items stored in a storage volume generating a logical inventory map of the storage volume so that time-related mappings can be compared to detect item receipts and withdrawals. Preferred embodiments employ a novel electronic shelf unit equipped with a sensing grid or array of sensors that detect items supported on the shelf optically, or by pressure transducers or the like. Inventory information can be collected from multiple shelves and relayed to remote vendors or local computer systems for billing and reordering using infrared transceivers for communication between the shelves. A novel shelf supervisory unit has a modem to communicate remotely via the phone lines and an onboard processor to manage communications. The system has particular application to consignment marketing of surgical and medical supplies in medical suites.

15 Claims, 20 Drawing Sheets

COLUMN IDENTIFIER SUBPROGRAM 306

COMPARISION TEST SUBPROGRAM 308

MATRIX UPDATE SUBPROGRAM 316

MATERIALS MONITORING SYSTEMS, MATERIALS MANAGEMENT SYSTEMS AND RELATED METHODS

TECHNICAL FIELD

The invention relates to a materials monitoring system, a materials management system employing information generated by the monitoring system and related methods of managing materials inventories. It further relates to methods for managing or tracking movements of materials inventory items to or from a storage location, for example inventory stored on one or more shelves in a supplies room or in warehouse bins or racks. In particular, one aspect of the invention provides novel means for monitoring the movement of product items out of inventory which is especially, though not exclusively beneficial in solving problems occurring in supplying materials to medical suites.

BACKGROUND OF THE INVENTION

A state-of-the-art supermarket is reasonably sophisticated with regard to monitoring of inventory movements and management of inventory. Most items are bar coded to identify them. Customers pick desired items from the shelves, carry them to a point of sale, such as a checkout counter, where an operator, the checkout clerk, scans each item with a bar code reader to identify and price the item and charge it to the customer.

Scanning its bar code label at the point of sale captures the movement of the item out of inventory and can be used to indicate action to replenish the shelf stock. Drawbacks of this system are that an operator is required to scan individual items and collect payment, and that inventory movements captured at the point of sale, the cash register may not reflect shelf conditions because some withdrawals from a shelf may not be checked out at the cash register owing to pilferage, breakage, misplacement and so on. These problems are magnified when efforts are made to apply such inventory monitoring and management practices to materials supplies for medical suites.

In medical suites there is usually no operator to supervise and log the removal of surgical and medical supplies from storage and a medical technician or nurse is expected to track usage and post information on materials used to a patient's record so that the patient can be billed for them. Needless to say, in the intense, time-sensitive environment of a surgical suite, for example a cardiac suite, where nurses and technicians have other priorities, errors can occur. In some cases procedures are so loose as to depend upon the use of product labels retrieved from discarded packaging in the suite, after surgery, to log expensive items such as catheters, and even pacemakers, to a patient's record. The probable losses suffered by hospitals as a result of errors in accurately logging all used items to a patient's record are substantial.

Another problem for hospitals maintaining medical suite supply rooms, is that the stored supplies can represent a of significant capital investment. A single cardiac suite may store half-a-million dollars-worth of surgical supplies. Consequently, it would be desirable to have vendors carry the cost of such inventory, consignment marketing, while maintaining the inventory on hand at the suite to be available for immediate use. Known inventory management systems that can be operated in a medical suite lack adequate controls and safeguards for the vendor.

Consignment marketing is a marketing practice wherein a remote vendor maintains an inventory of product items at a customer's facility and invoices the customer facility for each item withdrawn from storage by the customer relieving the customer of the cost of carrying inventory and of responsibility for reordering. In consignment marketing, the vendor owns the shelf inventory at the customer facility. In re-seller marketing the customer facility buys or becomes responsible for product items when they are put into storage and subsequently resells the items to end-users or other consumers. In the case of a medical facility, the end users to which products are sold are patients.

Usually, the vendor's representative visits the customer facility at regular intervals, takes inventory, charges the customer for items withdrawn from the vendor's shelf, and replenishes the stock. This system can work well for low cost items in a relatively well-controlled environment where the primary business is retailing or reselling, but no vendor wishes to entrust thousands of dollars of inventory to a medical facility environment where the inventory controls are poor and reselling supplies is an activity of only secondary significance to the primary mission of patient care. Discrepancies between total shelf withdrawals and customer's records of relevant billed items may create serious undesirable disputes which no vendor wants to have with important customers.

There is accordingly a need for a materials monitoring system that can, without requiring operator intervention, track withdrawal of product items from storage in inventory sufficiently well to be useful in a medical suite.

SUMMARY OF THE INVENTION

The invention, as claimed, is intended to provide a remedy. It solves the problem of how to provide an unattended materials monitoring system that can remotely report what items are withdrawn from a storage volume, for example from a storage shelf. In a preferred embodiment, an electronic shelf unit for storing product items is equipped with an item-sensing grid of sensors which detect the movement of materials product items to and from the shelf and an electronics unit to process sensor signals and communicate inventory movements remotely.

A remote vendor, or other party can be continually informed of what inventory items are present on the shelf at any point in time, and can use this information to generate bills and reorders. By means of the invention, whenever an item is removed from the shelf, the shelf unit will automatically communicate to the appropriate vendor, providing time, date, product identification and the location of the shelf.

Preferably, item identification information is posted to the shelf unit and stored there when items are received. Then, when items are withdrawn from the shelf, this information can be accessed, for example by referencing storage locations on the shelf, and used to identify the items without any further input.

In one broad aspect the invention provides a traffic-sensing electronic product-storage unit comprising:
  a) a storage volume for multiple product items;
  b) an item activity-sensing subsystem continually to detect numbers of product items in said storage volume and produce a sensed item activity output; and
  c) a data-processing subsystem to process said sensed item activity output and report product item traffic including product item withdrawal information;
whereby said product storage unit can automatically generate a product traffic report, including withdrawals of product items from said storage volume, as said withdrawals are made.

Where the product items have individual identification parameters, said data-processing subsystem has parameter sensors to detect one or more of the identification parameters and provide a sensed parameter output, said sensed item activity output includes product item identification data from said sensed parameter output whereby said product item identification data can be included in said product traffic report.

In another broad aspect, the invention provides an item-sensing product item storage system comprising:

a) a storage volume for storing multiple product items at rest;

b) an item-sensing system to sense the presence of each said product item stored at rest in said storage volume to provide sensor information for generating a first inventory map of said product items stored in said storage volume at a point in time;

c) a sensor scanner to provide said sensor information for generating a subsequent inventory map of said stored product items at a subsequent point in time; and d) a data processor to compare said first and previous inventory maps and output a product item movement report of changes in said item inventory.

In a further broad aspect, the invention provides a method of managing a materials inventory maintained in storage at a remote location from a central location physically removed from said remote location, said method comprising:

a) monitoring removal of materials product items from storage by means of a sensor system responsive to displacement of said product items to provide a monitored item report;

b) electronically transmitting said monitored item report to said central location; and c) using said monitored item report at said central location to initiate replenishment of and accounting for said removed product items.

BRIEF DESCRIPTION OF THE DRAWINGS

Some embodiments of the invention including one way of carrying it out will now be described in detail below with reference to the drawings in which.

DETAILED DESCRIPTION OF SOME PREFERRED EMBODIMENTS

The systems and methods of the invention are particularly, but not exclusively, useful to facilitate consignment marketing of materials items, particularly in locations such as medical suites, that are not supervised by a sales or inventory clerk responsible for checking out product items withdrawn from inventory. It is contemplated that the invention can be beneficial in solving many inventory management problems by removing the point of monitoring of product item withdrawals from a storage area focal point, such as a centralized checkout or a checkout at a point of egress, as is customary in retail stores, and locating the point of monitoring at the point of storage of each item.

While the invention can be applied to a wide variety of materials items, subject only to their physical suitability for handling by the system of the invention, and their economic significance, a particular field of application is in tracking and inventory management of medical equipment and supplies, especially surgical equipment and supplies. Such an application will now be described in more detail. A consignment marketing materials monitoring system according to the invention, which is suitable for a medical suite, is operable at a customer facility to monitor and report materials traffic into and out of storage in storage volumes defined at storage devices at the customer facility. A remote vendor can be equipped with a compatible materials management system component to receive materials traffic reports, invoice the customer for materials withdrawn from storage and to initiate replenishment of materials stocks at the customer's facility.

The customer facility component of the materials monitoring system of the invention can comprise one or more local materials product storage stations, each of which has at least one traffic-sensing product storage unit, which may be an electronic shelf unit, as will be described, a facility communicator for remote, long-distance communication of materials product traffic information, and, for facilities with multiple stations, a shelf supervisory unit to relay traffic information to said facility communicator. Preferably, each traffic-sensing product storage unit, or electronic shelf unit, incorporates its own short-range communicator to transmit unit traffic information to the station or facility communicator and to receive control or product receipt signals therefrom.

Figure 1:
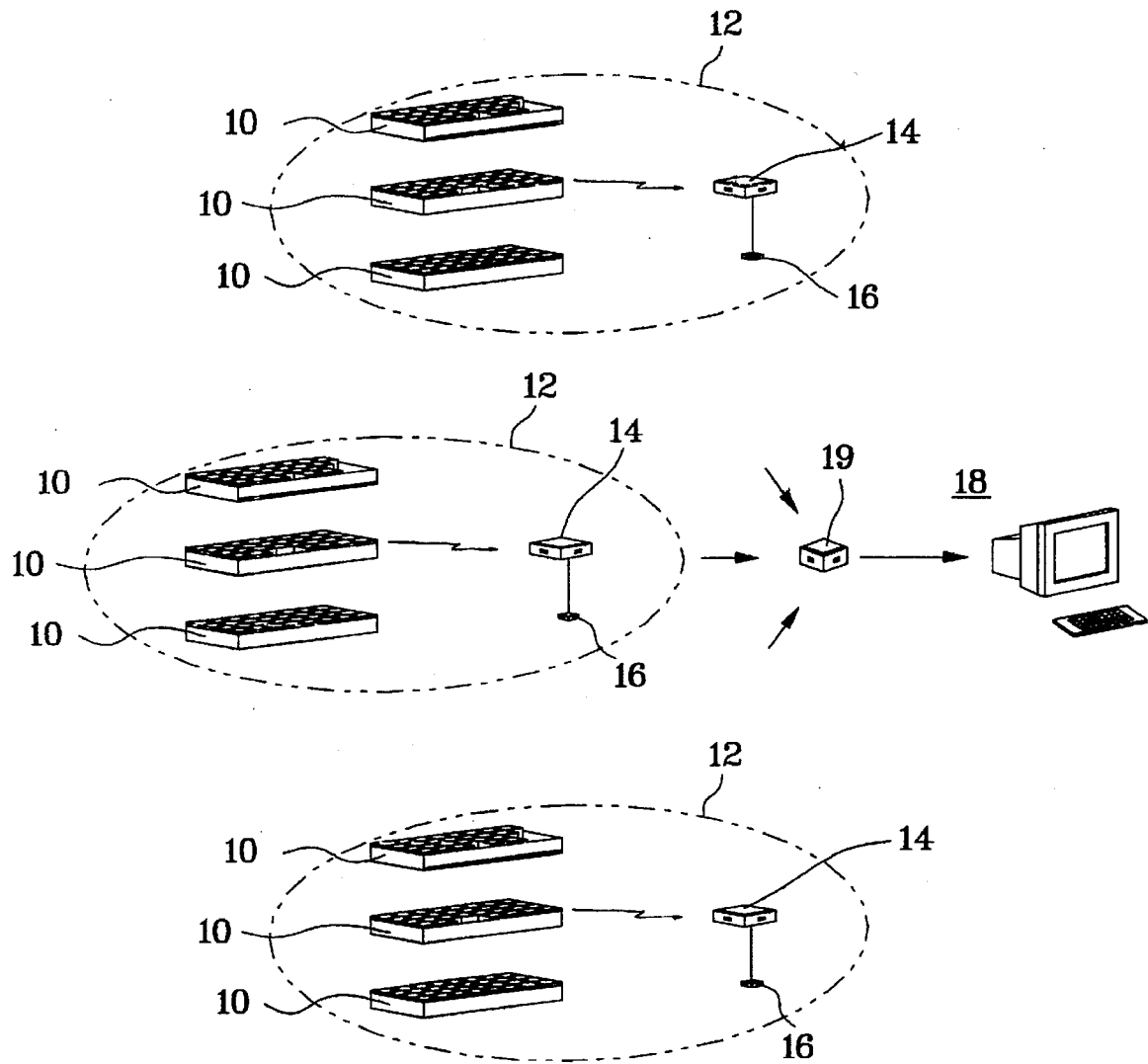
FIG. 1 is a schematic representation of a materials monitoring system including several materials storage and traffic-sensing units, each such unit comprising multiple electronic shelf units. The system is locatable at a customer's premises to provide real-time information on movements of inventory items to a remote location, such as a supplier's facility.

Referring to the drawings, the materials monitoring system shown in FIG. 1 comprises a number of traffic-sensing electronic shelf units 10 for storing materials products. Multiple electronic shelf units 10 can be organized into local product storage stations 12 which may comprise, for example, racks, bins or bays in a storage or supplies room or warehouse, or may comprise any other convenient grouping of shelf units 10. There is no particular limit to the number of shelf units 10 in a product storage station 12. Depending on the nature and quantities of the products comprising the stored materials, and upon communications considerations, there are preferably from two to twenty-four shelf units 10 in a storage station 12, and more preferably from three to eight.

Each electronic shelf unit 10 outputs product traffic information to a shelf supervisory unit 14 which is coupled by communications interface 16 with a vendor's computer 18 supporting a vendor's inventory management system or other software, at a remote site, via a direct-dial telephone communication or other remote communications link to a vendor's modem 19. Preferably the vendor's inventory management system includes an interface module seamlessly compatible with the customer facility systems described herein to enhance speed and minimize complexity.

Electronic shelf units 10 sense and can report product usage, or withdrawals, to the vendor, in real time, by sensing the presence or absence of individual product items 30 in storage on the shelf unit 10. Each shelf units 10 can respond to the withdrawal of a product item stored at rest on the shelf unit 10 by transmitting a product traffic report signal over the airwaves, or via wire, if preferred, to shelf supervisory unit 14, for forwarding via modem to the vendor's computer 18.

A significant and novel feature of the invention is an ability remotely to report product item withdrawals, in real time, without human intervention. By means of the invention, the process of withdrawing an item from the shelf and taking that item out of inventory for consumption, disposal, onward distribution or other act rendering the host facility accountable to the vendor for that item as a customer for it, can be reliably sensed at the customer's facility, electronically memorialized and remotely reported. The product-withdrawal reporting system constituted by an electronic shelf unit 10 and its associated communicators is triggered by the physical act of withdrawal of a product item 30. While the act of withdrawal will commonly be effected by a human materials picker, mechanized inventory retrieval systems can also be employed.

Electronic shelf unit 10 is thus cognizant of product withdrawals and that knowledge can be electronically stored or transported to the vendor where the real-time, or automated on-demand availability of the inventory draw-down information provided by the system of the invention yields significant business advantages. The materials monitoring system shown can be beneficial within any facility for managing and controlling materials ordering and outward invoicing of items withdrawn. As such it is particularly beneficial to remote vendors desiring unattended tracking of product withdrawals from storage and is especially useful for consignment marketing of items, as describe above, regardless of the particular marketing or business arrangements.

The prompt availability of fresh, or contemporaneous, inventory drawdown information at the vendor's facility transmitted from the customer facility materials monitoring component reduces distribution delays and effectively moves the point of purchase from the vendor's facility to the point of usage at the customer's facility. The system of the invention thus facilitates "just-in-time" materials management wherein inventory on hand is minimized and replenishment arrive just prior to exhaustion. Neither vendor nor customer has to make significant investments in cash-consuming inventory accumulations which may become dated or obsolete.

Up-to-the-minute product withdrawal information can be used at the vendor's facility to bill the customer, to generate new orders for that customer or compile new orders or shipments, to report sales information and for any other purpose the vendor may choose. Outages and excesses are readily controlled and special measures may be taken. For example, if critical surgical equipment or supplies are unexpectedly exhausted, replacements may be rushed out to the customer by courier or special messenger. By automatically invoicing the customer according to product traffic movements reported from the electronic shelf units 10, substantial savings in paperwork can also be obtained.

As an alternative to real-time data reporting, product withdrawal data may be retained at a shelf unit 10 or in the vicinity of a local product storage station 12, in permanent electronic storage, and the vendor system may periodically poll each or the respective electronic shelf unit 10, or other associated data storage system, via communications interfaces 16 and shelf supervisory units 14, to collect the stored data.

An advantage of the system of particular value to a medical facility or medical suite is that the medical facility (the customer) can make inventory withdrawals of product items, they can be tracked, invoiced by the vendor and replenished without requiring any paperwork by the medical facility. This is of special value in the pressured atmosphere of a medical emergency, where time is of the essence and may not permit pauses for completion of paperwork to log supplies and equipment used.

The materials monitoring system of the invention described herein enables a vendor to supply merchandise to a customer, especially for example to a hospital, on consignment, with confidence that the customer will be accountable for used product items. The vendor does not have to send a representative manually to inspect the consigned inventory at the customer's facility to generate an invoice and reorder. Nor must the vendor rely upon the customer's uncertain efforts to those ends. Instead, the vendor can have all the information needed for efficient materials management, with immediacy and confidence in its accuracy.

In addition to the benefits provided to the vendor, and the customer advantages of reduced paperwork and reliable restocking, pursuant to the invention, as will be further described hereinafter the customer can also use the product usage data generated by the system of the invention. The product usage data can be incorporated in the customer's systems to ensure that the end user, or in the case of the medical facility, the patient, is held accountable for, or billed for, withdrawn items.

By employing simple expedients, such as a requirement to enter a user identifier before a product can be released from inventory, user allocation of withdrawn product items can be established. Some access control to prevent unidentified withdrawals is preferable, for example a physical locking system to restrict access to product items, or an audible alert of unidentified withdrawals, or both measures. Utilized in this manner, the materials monitoring system of the invention, with its traffic-sensing product storage units can tighten the materials dispensing procedures used at many medical facilities giving managers of those facilities confidence that all materials or items withdrawn under the auspices of the materials monitoring system of the invention will be billed or otherwise accounted for by patients. Subject to the accounting methods employed by the customer facility, consignment marketing using the materials monitoring system of the invention enables the customer facility to pass through the costs of consigned materials product items and avoid investment in them.

Electronic shelf unit 10

Figure 2:
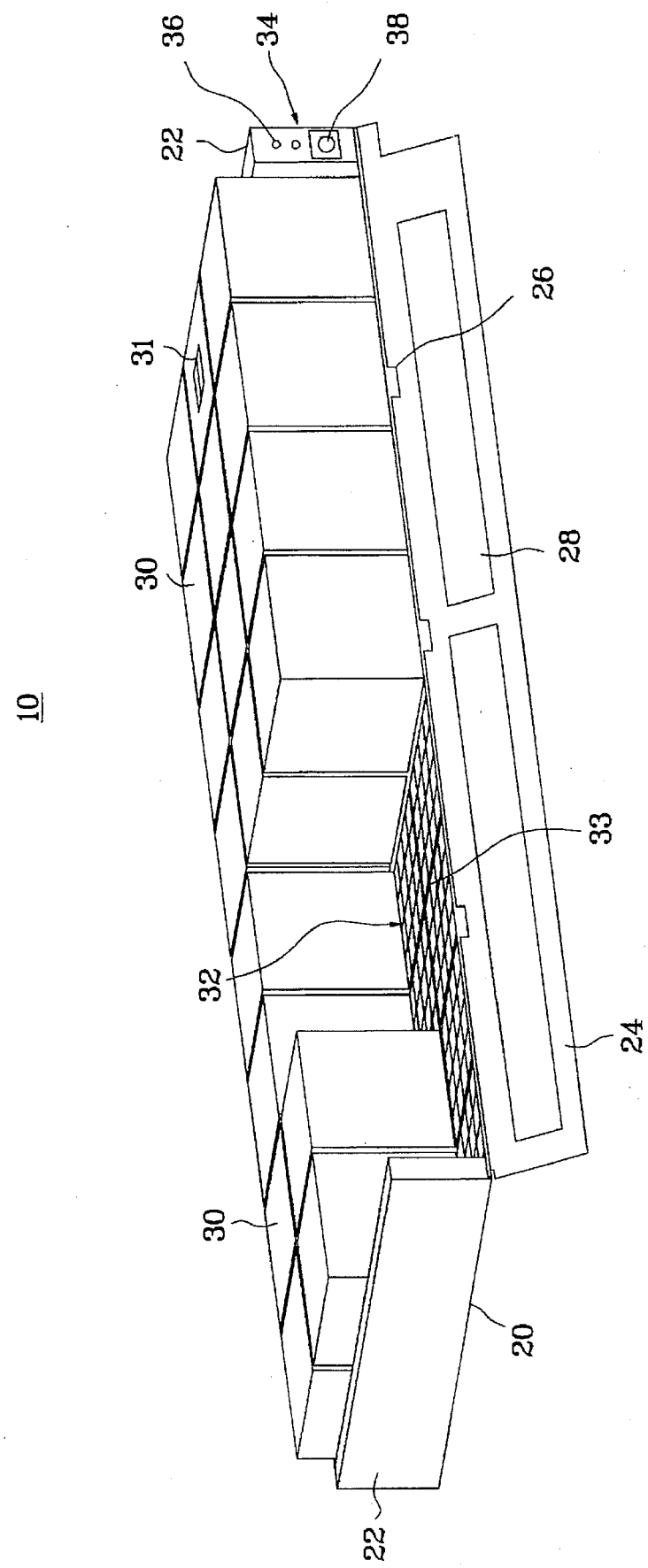
FIG. 2 is an enlarged perspective view of one of the electronic shelf units of the materials monitoring system of FIG. 1, which shelf unit has a hinged front flap, here shown in an open, downwardly disposed position.

Referring now to FIG. 2, one embodiment of product storage and traffic-sensing electronic shelf unit 10 for use in the materials monitoring system described in FIG. 1 comprises a tray-like shelf 20 having a back panel (not shown), a bottom panel which is also out of sight, side panels 22 and a fold-down front panel 24 with hinges 26 pivotally securing front panel 24 to the bottom panel.

Electronic shelf 20 defines a storage volume, for receipt of product items 30, between its front, side and back panels, the upper limits of which storage volume are determined either de facto by only permitting storage of a single layer of product items 30, or by physical constraints, (not shown), such as an overhead cover, or a higher shelf in a rack or bay of shelves.

The inside surface 28 of front panel 24 which is exposed when it is folded down as shown in FIG. 2 provides a convenient location for displaying the vendor's instructions for use of the electronic shelf unit 10. These instructions may include detailed listing of user-input function codes and the like, if a user input device is also provided (see FIG. 5). Also, vendor-specific product usage instructions and codes required for loading product onto the shelf can be located on the inside of the front panel.

Electronic shelf 20 is a self-contained, retro-fittable materials storage and monitoring system equipped with item-sensing, data-processing and communications subsystems to enable it automatically to monitor traffic of product items 30 received by and withdrawn from the storage volume provided by shelf 20 and report that traffic remotely.

An item-detecting subsystem comprises a sensing grid 32, covering the bottom panel of shelf 20 which sensing grid 32 comprises an array of sensors 33 responsive to the presence of product items 33. Sensors 33 are preferably binary and provide a digital output. However, if a proportional weight-related signal or other graduated signal output is desired, sensors may be analog and the output signal can be converted to digital for processing.

Shelf 20 and grid 32 support product items 30 so that the presence of any product items 30 stored on shelf 20 is detected by sensing grid 32 which is constantly being scanned by a microprocessor in an electronics unit 34. Any activity detected by the electronics is transmitted to a supervisory unit using infra-red optical signaling, as described in more detail in connection with FIG. 4.

Sensing grid 32 can comprise an array of sensors, for example pressure transducers providing co-ordinates for describing sensed patterns or footprints so that sensing grid 32 is responsive to both weight and form parameters of product items 30.

Additional sensors, or additional such sensing grids, may be incorporated into side panels 22 and back panel of shelf unit 20, depending upon the shape and size of product items 30. In the embodiment shown, product items 30 are depicted as packaged standardized square-sided box containers for optimal modular space utilization and to provide a simple footprint that can be easily sensed.

Clearly, items 30 can comprise any product that will fit within shelf 20. The system is particularly beneficial for merchandising product items 30 of significant value, for example, items having a value in excess of about $50.00, some examples of which can be as physically diverse as pacemakers, catheters and other cardiac supplies as well as swabs, forceps, drugs, and so on. Individual items 30 may vary in shape, although they will usually be boxed, and frequently, different products may be packed in similar boxes, the contents being externally identified.

Preferably the product packaged in or constituted by each item 30 is identified by a product label 31 which is desirably machine-readable. Label 31 can be, for example, a bar-code label, but can take other forms, for example magnetic, holographic, radio-emitting and so on. The importance of watertight tracking of inventory movements while permitting effortless withdrawal of product items 30 is readily apparent for expensive items.

The system is also beneficial for tracking low cost items, especially commodity items, if they are used in significant volume. Products such as tape and swabs will rarely be subject to individual accounting, leading to shortages when they pass reorder points without triggering reorders, and possibly underbilling. The relatively modest costs of deploying the materials monitoring system of the invention for such consumables can quickly be amortized by elimination of these inefficiencies.

Other sensors can be used in addition to or in place of the pressure transducers in sensing grid 32. For example optical sensors (not shown) may operate between side walls 22, or between front panel 24 and the rear panel of electronic shelf 20, to provide information about the extent of product items 30 into a plane above sensing grid 32.

Other types and arrangements of item sensors will be apparent to those skilled in the art.

Depending upon the application, sensors 33 may be optical, piezoelectric or capacitative, or may employ any other physical principle permitting detection of movement of a product item 30 out of an at-rest storage position on shelf unit 20. Optical sensors each comprising a light emitter and a detector unit can be used. Such light emitters may be small incandescent units, or emitter cells but are preferably laser diodes, the detectors being chosen according to the nature of the emitter. Incoherent light or incandescent sources are undesirable for battery-powered shelf unit applications, in view of their power requirements.

An alternative sensor 33 is a piezoelectric sensor which has the advantage of being signal-generating and therefore not requiring a power supply. Another alternative is a capacitive sensor the capacitance of which changes in response to pressure from the weight of product items 30.

A precise orthogonal grid arrangement of sensors 33 may induce moiré-like effects in the electronic output, confusing interpretation of the signal, analogously to moirés that can occur in dot-based process printing and are avoided by adjustment of the dot angle of one or more of the primary inks. Although moiré interference may be eliminated by electronic filtering it is preferred to avoid, or reduce the interference by suitable relative positioning of sensors 33.

To this end, a preferred sensor arrangement employs a somewhat irregular spatial distribution of sensors, for example, an at least partially randomized distribution whereby, on one, larger granularity scale, the spatial distribution of sensors is relatively uniform, within specified brackets of variation, whereas on a smaller granularity scale, the distribution of sensors 33 displays a significant degree of randomness. Thus the distribution may be such that a product item 30 occludes a relatively constant number of sensors 33 as it is moved about sensing grid 32, yet at a granularity comparable with an average spacing between sensors, the distribution displays significant randomness.

Alternatively, an offset arrangement may be used whereby each sensor 33 is disposed at a fixed distance from a regular grid point which distance is small compared with the grid pitch, for example from one-tenth to one quarter of the grid pitch, the directions of offset of neighboring sensors being correlated so that pairs of neighbors are offset in different directions and preferably are balanced about their respective grid points.

In an embodiment suited to mass production of sensing grid 32, sensors 33 are solid-state semiconductor devices and sensing grid 32 is produced in continuous film manner employing for example a polyester film such as MYLAR film (trademark DuPont) as a substrate to support the sensor array and related circuitry and wiring which can be fabricated by techniques such as chemical vapor deposition or other techniques known to the semiconductor fabrication arts. Using a pressure-responsive, e.g. compressible, dielectric material, sensors 33 can be capacitive. Arrays of capacitative devices draw very little current.

Described has been an item sensing system which is essentially operative in the plane of item-supporting shelf 20 on which product items 30 rest during storage, which may optionally be supplemented by one or more complementary sensors in a plane or planes above the item support surface. This is one way of sensing the presence of items in the item storage volume defined above shelf 20. Other sensing systems can be used, for example three-dimensional movement detection systems employing infrared, ultrasound, optical, radiowave or other signalling techniques, accompanied by suitable processing such as ranging or imaging to determine the inventory status of stored items 30 on electronic shelf unit 10 and, more specifically to determine what items 30 are stored at what locations on shelf 20 at any given moment. Electronics unit 34

In addition to the product storage and sensing functions provided by shelf 20 and sensing grid 32, electronic shelf unit 10 is equipped with a built-in electronics unit 34 providing electronic services including interpretation of signals from sensing grid 32 and storage and communication of descriptive and quantitative information about product items 30 stored on shelf 20. These subsystems and components can conveniently be incorporated, as shown in FIG. 2, in right-hand side panel 22 of electronic shelf 20.

Electronics unit 34 can include data storage and processing capabilities to drive sensing grid 32 and interpret and store the responses received from sensors in the grid 20, along with two-way communications subsystems to export the sensed data and receive controls, programming, and incoming product information. Received product information, regarding new product items 30 placed on the shelf, can be input by an operator using, for example, a bar code reader, or may be received electronically, for example via the communications subsystems.

A preferred communications device is an optical signalling infrared data communications transceiver of which antennae 36 are shown. Infrared optical signalling has the particular advantages, as a local communications medium for a self-contained shelf unit, of being wireless, low interference and not regulated in the United States. That shelf unit 10 not generate any significant interference is important in communications-rich environments, such as a hospital environment. Also infrared signalling is not regulated by the FCC and transmission licenses are not required. Some drawbacks of infra-red are a short range and line-of-sight requirements, but these limitations can be comfortably accommodated in the contemplated embodiments of the invention, ideally suiting infrared signalling to the communication needs of a self-contained, wireless shelf unit 10.

Figure 3:
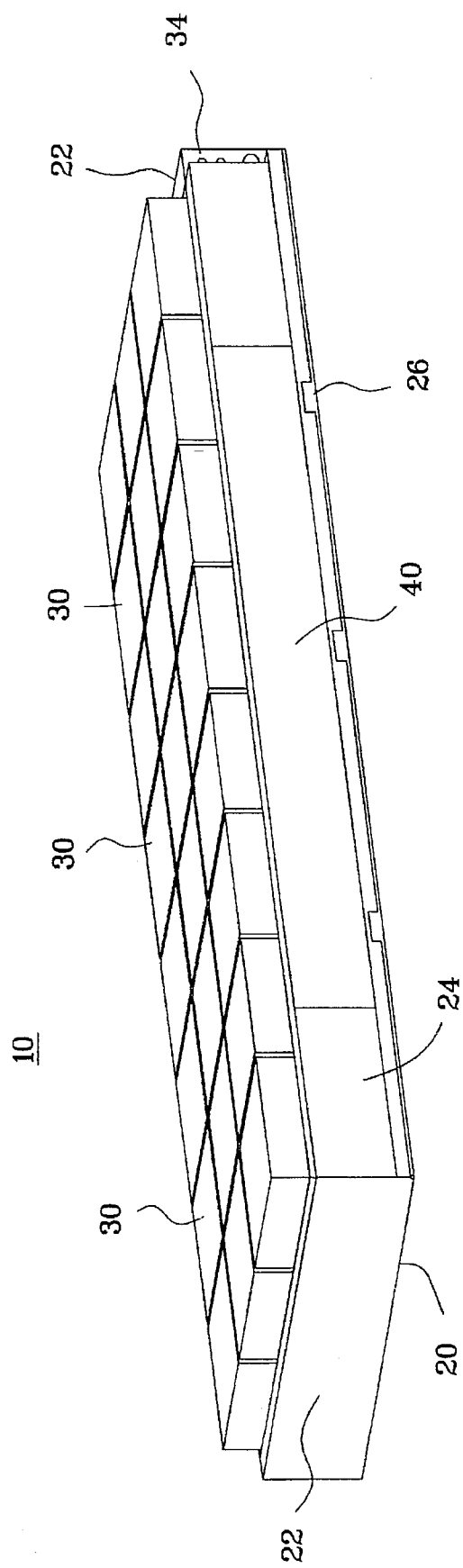
FIG. 3 is a view of the electronic shelf unit of FIG. 2, on a reduced scale, with its front flap in an upright, closed position and partially loaded with inventory items.

Also shown in right side wall 22 is a terminal 38 for connecting or plugging a data input device such as a bar code scanner, hand-held terminal or the like for entering stock receipts of items 30 loaded onto the shelf. FIG. 3 shows the front panel 24 closed to provide a convenient display surface 40 for the display of a vendor's logo or advertisement or promotional material serving to identify and describe product items 30 stored on electronic shelf unit 10 for users and dispensers of items 30. Usage codes and other instructional information about the system of the invention can also be provided on display surface 40, if desired. A particularly valuable use for display surface 40 is to provide a listing of relevant numbers, part numbers, alpha or alphanumeric codes with corresponding bar codes printed alongside the listing available for convenient scanning.

As is clear from FIG. 3, electronic shelf unit 10, here shown loaded with product items 30, has the configuration of an open tray which can readily be modular and can be fitted or accommodated to standard or pre-existing shelf units, for easy retrofitting to, for example bin- or rack-storage units. Alternatively, shelf units 10 can be formed to any desired module for a particular customer facility or group of customers.

Preferred embodiments of shelf unit 10 include a physical access control device to prevent unauthorized removal of items from the shelf. As described more fully with reference to FIG. 5, shelf unit 10 can also include user-identification and data entry devices.

Where items 30 have significant physical height, as well as width and depth, as shown, physical access control can be obtained by providing locking means for front flap 24 operable in conjunction with overhead barrier means preventing physical withdrawal of items 30 over front flap 24 while in its upright position. Such overhead barrier means (not shown) may be constituted by an overhead shelf, cross piece, or other enclosing obstruction. Alternatively an overhead housing may be provided for the purpose, which housing permits manual withdrawal of items 30 only when flap 24 is open.

Electronic shelf unit 10 thus provides a self-contained inventory storage and sensing system which can be readily installed on existing shelving, can monitor product withdrawals without the intervention of an operator and can receive and report relevant data and control signals wirelessly. Inventory can readily be maintained by occasional visits of a vendor's representative to restock and run manual checks, as needed.

Operation of electronic shelf unit 10

Figure 4:
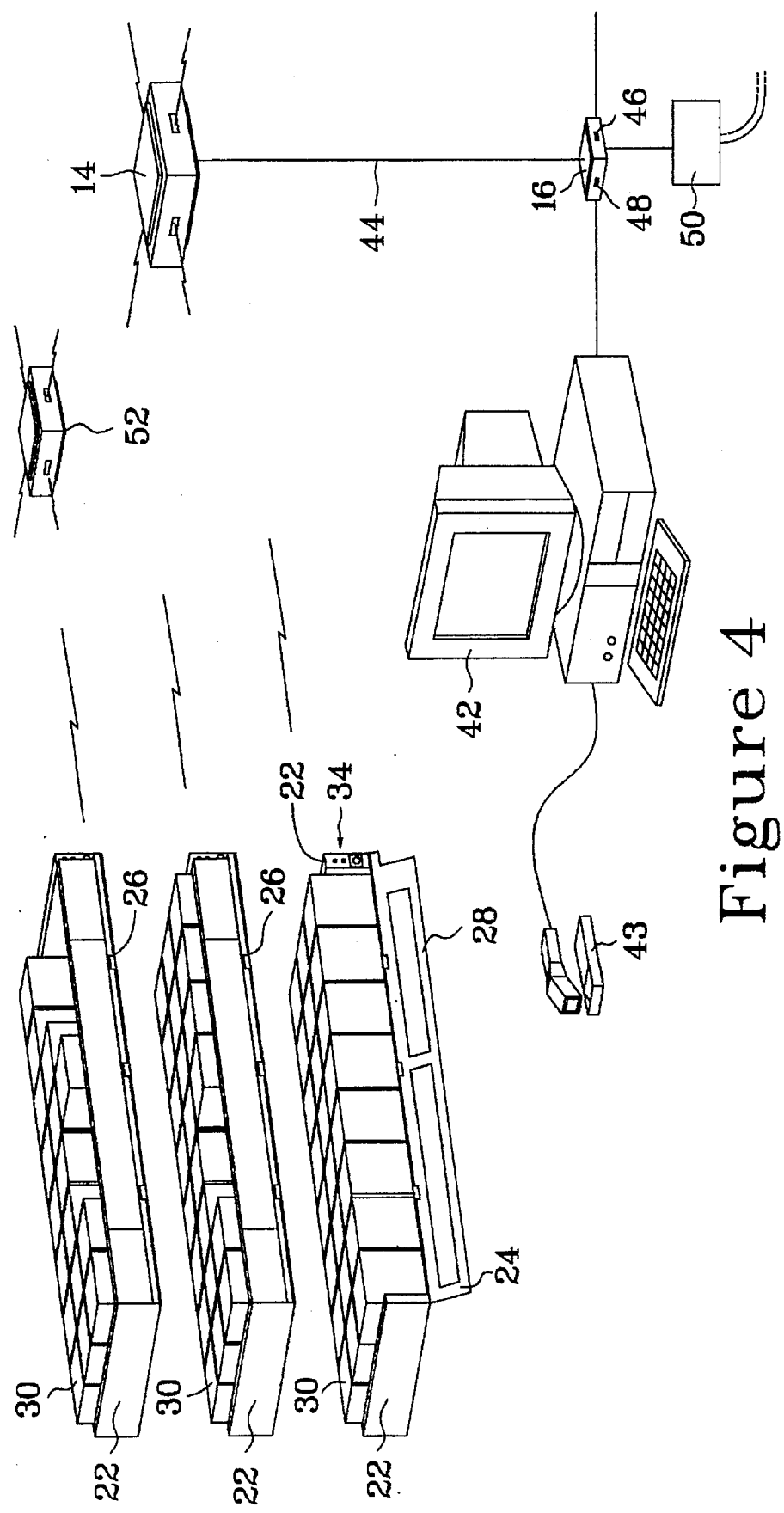
FIG. 4 is another schematic view of the materials monitoring system shown in FIGS. 1-3, showing means for collecting and relaying inventory data from a multiplicity of item-sensing shelves physically distributed at different locations in a facility, for example distributed through a supply room or warehouse.

Any activity associated with a shelf unit 10, namely product items 10 being withdrawn or placed on each shelf 20, is automatically transmitted to an optical transceiver shelf-supervisory unit which will relay the shelf activity to a central monitoring station for example a vendor's sales or administrative office, via telephone communications, and, optionally also to a local personal computer at the customer facility (see FIG. 4.).

Sensor-signal-processing software in electronics unit 34, one possible embodiment of which will be described hereinbelow with reference to FIGS. 9–21, uses intelligent algorithms to monitor the footprint of each item 30 located on the shelf.

Preferably the sensor-signal-processing software is operative to generate a timed, mapped image of the footprint of items 30 on shelf 20, which can optionally be committed to storage in RAM, (or even permanent storage, if desired) and this footprint image is compared with a previous footprint image, which may also be maintained in RAM for an appropriate period, to yield information as to the withdrawal from, or placing on, shelf 20 of one or more items 30.

To achieve the objectives of this invention, it is not necessary to track the movement of an item as it is withdrawn from, or arrives at, the shelf, what are required are static views of the inventory condition of shelf 20 from which such withdrawal or receipt may be inferred. There is thus no need to detect the actual velocity or motion of a moved item. More appropriate is a mapping of the shelf to indicate the locations of all items. In preferred software embodiments, the mapping process is facilitated by maintaining a footprint, or other functionally equivalent record, of the shelf inventory status as a whole, together with individual maps or other records to describe the footprint and shelf location of each item, or possibly, each vertical stack of items, stored thereon. Preferably, the system calls for the entry of an item identifier for each item placed on the shelf, for example by scanning a bar code, and the software enables that identifier to be associated with a shelf storage location for that item. Such receipt data may then be referenced, by shelf location to determine the identity of an item withdrawn from the shelf unit 10.

Should an item 30 be moved on shelf 20, the electronics will track the movement and note the new location. Should an item be removed completely from the shelf, that fact is reported to the vendor as an inventory withdrawal. Should an item be removed then replaced, the action can be reported with an annotation querying the identity of the returned item, such queries to be resolved by manual inspection during the vendor's representative's next visit.

One or more shelf units 10 can be fully integrated into a remotely managed materials monitoring system by providing suitable communications and control devices at the local customer facility hosting the shelf units, for example, as shown in FIG. 4. The communications range of shelf units 10 is quite limited, perhaps no more than 100 or 50 feet, or less.

Accordingly, some means is needed at the customer's facility to manage shelf communications, forward inventory movements to the appropriate remote vendor facility, or other administrative location remote from the storage area (albeit possibly in the same building), and perform other necessary management functions such as monitoring for out-of-service shelf units.

As depicted schematically in FIG. 4, these functions are performed by one or more intelligent, processor-equipped shelf supervisory units 14 equipped with optical signalling infrared transceivers and dedicated modems to serve as communications relay stations. Shelf supervisory units 14 can poll individual shelf units 10 in response to remote requests or their own programming, and forward inventory movements reported by each shelf unit 10 to an appropriate remote location.

Referring to FIG. 4, three electronic shelf units 10 are shown in communication with, and serviced, or controlled by, a shelf supervisory unit 14 depicted in an elevated position, for example six to twelve feet up a storage room wall or in a high ceiling area, where it can command an unobstructed line-of-sight view of each of multiple shelf units 10, and specifically of their antennae 36 in order to communicate with each shelf unit 10 by the preferred optical signalling mode of infrared transmission and reception.

Shelf supervisory unit 14

Each shelf supervisory unit 14 is physically displaced from the shelf unit 10, by a distance sufficient to enable the shelf supervisory unit 14 to serve multiple shelf units 10 and to be in line-of-sight communication therewith, for example at a distance of from about 3 to 50 feet, preferably from about 6 to about 20 feet from shelf unit 10. The maximum distance is limited by optical attenuation. Shelf supervisory unit 14 is serviced by a communications interface 16 which provides power and external wired communications connectors to the telephone network and, if desired, to a local personal computer 42. Communications interface 16 can be located near a convenient power outlet, for example beneath supervisory unit 14, and services that unit through an umbilical cable 44.

Preferably, each supervisory unit 14 comprises an optical signalling infrared transmitter and an infrared detector, as is described in more detail with reference to the circuit schematic of FIG. 8, hereinbelow, along with a suitable microprocessor, memory and modem. Several optical transmitters within the supervisory unit 14 generate infrared signals required to transmit data to shelf units 10. Multiple infrared detectors, also included within transceiving supervisory unit 14, detect the presence of signals emitted from the shelving units. Individual detectors and transmitters are paired and oriented towards different groups of shelves to provide area-wide coverage around the supervisory unit 14, according to the particular physical layout. Multiple simultaneous transmissions or receptions can be handled.

Programming of supervisory unit 14

Supervisory unit 14 supports and runs its own software. Relevant programming can be hardwired, on a PROM or uploaded from a remote location via the built-in modem. Supervisory unit 14 is dedicated to the functions described herein, minimizing hardware and software requirements.

Also, communications functions can be performed by a dedicated modem adapted to effect data transfer and control signal needs in a predetermined format to known locations and need not embrace the multifarious functions expected of a shrink-wrapped modem intended for open environments.

Preferably, remote managing locations employ software modules fully integrated with supervisory unit 14 and shelf unit 10 functions to simplify data processing and storage and communications requirements at those units. Supervisory unit 14 is preferably remotely programmable at least to the extent of permitting updating of key data such as remote location phone numbers, supervised shelf identifiers and the like.

Additional desired or necessary information for supervisory unit 14 to function can be downloaded from each vendor's computer 18 over the telephone lines. In addition to the vendor's primary telephone number which is called when a change of inventory status occurs, an alternate number to call, the vendor's password, and instructions as to whether a local PC, printer, or other device should receive the information can be downloaded. Each vendor may also program the unit to call at a particular time each night, with an inventory list, instead of automatically initiating a call whenever a change of status occurs. Preferably, a single supervisory unit 14 can support multiple diverse instruction protocols for a multiplicity of vendors.

Communications interface 16

Communications interface 16 provides connections to a telephone line and, optionally, to a local personal computer 42 by means of which the customer facility can integrate inventory movements reported by one or more electronic shelf units 10, maintained by one or more vendors into their own accounting systems. A local bar code reader 43 can be used by the customer to read codes of customer supplied items, for example, pharmacy items, or other in-house products.

Communications interface 16 can be contained within the housing of supervisory unit 14, or for convenience of installation, it may, as shown, be supplied as a separate unit and connected by umbilical cable 44 to supervisory unit 14. Communications interface 16 can comprise, externally, a standard RJ11 telephone jack 46 to plug in a phone, and an RS232 serial port 48 for connecting to personal computer 42, and preferably plugs into a standard RJ11 wall jack. The phone line connection is split internally to service supervisory unit 14 and jack 46. A power transformer-rectifier power supply 50 to adapt the facility power supply to a suitable operational voltage such as twelve or five volts D.C. can be supplied as a separate unit, as shown, or may be incorporated with communications interface 16.

Umbilical cable 44 carries power, telephone and serial communications lines between communications interface 16 and supervisory unit 14 enabling supervisory unit to be located in an elevated position commanding line-of-sight views of multiple shelf units 10 or storage stations 12.

Several communications interfaces 16 may share a common telephone line. When making a call, an interface 16 (or supervisory unit 14 serviced by interface 16) will wait until a dial tone is available prior to dialing. While the system of the invention permits more or less immediate communication of item withdrawals or inventory status to a remote location, little will be lost in most cases by a brief delay in transmission while another supervisory unit reports in.

When receiving an incoming call, the software within each supervisory unit 14 will cause communications interface 16 to seize the telephone line and wait for a vendor or other caller identification code to be transmitted from the remote calling unit. If a recognized identification code is received, the supervisory unit 14 will respond and commence communications. Otherwise it will disconnect from the line.

Operation of shelf supervisory unit 14

Under normal operating conditions, on-site shelf supervisory unit 14 will automatically poll each shelf unit 10 to determine if there is any activity, with a frequency of, for example, 250 shelves in one minute. Polling is achieved by the supervisory unit 14 sending a shelf identification code, followed by a prompt to respond. That shelf unit which is programmed with the exact shelf identification code sent will respond and report whether or not there is activity. Preferably also, shelf identification codes accompany each inventory movement report sent from the shelf or the supervisory unit, so that the vendor or other recipient knows where the shelf is located.

Quiescent shelves may be polled as infrequently as once every five or ten minutes, or not at all when the storage facility is closed. If desired, polling may be initiated from a shelf unit 10 in response to activity there. It is not necessary to send separate reports of each item withdrawal from a shelf unit 10, to supervisory unit 14 because the shelf unit maintains a comparative "before-and-after" map or image of the shelf inventory and can report multiple withdrawals in one transmission. If desired, polling can be initiated in response to access activities at the shelf such as entry of access control codes.

Such polling can be initiated and controlled by programming residing at supervisory unit 14, or initiated remotely, for example by the vendor or others calling in to supervisory unit 14. Even if initiated remotely, the polling dialog with individual shelves occurs on site, not across the telephone network. The shelf supervisory unit 14 records and puts into memory any reported shelf activity. This information is acknowledged and saved at the shelf supervisory unit 14 which then polls any other shelf units 10.

If there is no activity, the supervisory unit 14 will proceed to poll the next shelf unit 10 in sequence until all shelf units 10 have been polled. Subsequently, the polling process is repeated.

If there is inventory activity to report from a shelf or shelves 20, that information will be transmitted back to the supervisory unit 14. Unless it is responding to an incoming call, the supervisory unit 14 in turn will initiate a telephone call via a modem and dialer to the appropriate vendor's management computer, according to the shelf's ID and a list of stored phone numbers and transmit the information. Upon acknowledgment, that the vendor's computer received the information correctly, the supervisory unit 14 will then send a signal to the shelf indicating that the change of status has been recorded. The supervisory unit 14 may also relay the activity information to a local personal computer or printer within the medical facility.

The vendor's computer may call a supervisory unit 14 at any time and after entering a password, may command the supervisory unit 14 to poll one or all of the shelf units 10 dedicated to that vendor's products, and to transmit to the vendor a list of product inventory on each shelf unit 10. Should a product item be identified by a serial number or date as having a shelf life that has expired, at the date of polling, which data can be maintained in an item description entry in electronics services 34, then the vendor (or user) knows it should be taken off the shelf and discarded.

The supervisory unit 14 unit also performs error checking to determine that transmissions to and from the shelf units 10 are functioning correctly and that communications between the supervisory unit 14 and the vendors' computers are also functioning correctly. Should there be a failure, the medical staff or vendor can be alerted.

Optical Repeater 54

Optical repeaters 54 can be used as satellites to extend the physical range of a supervisory unit 14 enabling it to communicate with shelf units 10 at a greater distance or to circumvent line-of-sight obstacles such as walls. This extended range can increase the number of shelf units 10 serviced by a single supervisory unit 14. Optical repeaters 54, which are preferably battery powered for convenience, perform an optical amplifier function, receiving weak infrared signals and retransmitting them as stronger signals. For this purpose, each repeater 54 may comprise optical transmitters, detectors and a microprocessor programmed to perform the repeating function. Each optical repeater unit 52 can supervise multiple shelf units 10 or storage stations 12 and may have a capacity of for example up to 250 units 10 or stations 12.

Data transmissions originating from a supervisory unit 14, which would normally be picked up by a shelf unit 10 within line-of-sight of unit 14, may be received by a repeater 54 and forwarded to an area which is either out of range, or not visible to the supervisory unit 14, such as around a corner, or to a different section of a storage room.

Conversely, each repeater 54 will also relay transmissions from the shelf units 10 within its area back to the supervisory unit 14. Several repeaters 54 may be used to provide full coverage throughout a medical suite or other department or facility.

It is a principle of preferred embodiments that the materials monitoring system of the invention can support inventory materials monitoring for multiple vendors preferably by assigning an exclusive storage volume, for example, an individual shelf unit 10, to each vendor. That shelf's transactions are then reported only to the shelf's vendor. Appropriate data packet addressing and other software controls ensure that other vendors cannot access information regarding product items 30 stored on any other shelf.

Shelf supervisory unit 14 can be used to distribute various shelf management functions outwardly from the vendor and to relieve individual shelf units 10 of long distance communication functions, controlling the power requirements and costs of shelf units 10.

To reduce installation requirements it is preferred that shelf units 10 are self-contained, with their own power supply and can be simply placed on, or bolted or latched to, existing shelves or shelf units, bins or racks. Where a multiplicity of shelf units 10 is required, power units and the running of extended power cables to each unit may be undesirable. In these circumstances, battery power is desirable. The batteries can be replaced by the vendor's representative when restocking. To prolong battery life and control unit costs, on-board shelf unit capabilities such as long-distance communication can be restricted and delegated to the shelf supervisory unit 14 which, as described above can more readily be located near a power outlet to provide support functions for multiple battery-powered shelves.

In an alternative power supply arrangement suitable for side-by-side racks each comprising a multiplicity of vertically spaced shelves, a common power supply, with a suitably low DC voltage output, for example 12 volts, can be disposed near a convenient power outlet and distributed though the shelf units via short jumper cables, each extending from one to another of adjacent shelf units.

Shelf supervisory unit 14 serves as a communications hub for multiple shelf units 10 and at the same time works for the vendor as a local overseer of shelf performance, promptly reporting shelf unit failures or abnormalities to the vendor for rectification by the vendor's representative.

When the system is deployed in a medical suite supply room, for example in a cardiac suite, supervisory unit 14 monitors the activity occurring at each shelf unit 10 within the room, and relays that information to a vendor's database computer and, if desired, to within the medical facility.

Access control options for electronic shelf unit 10

Figure 5:
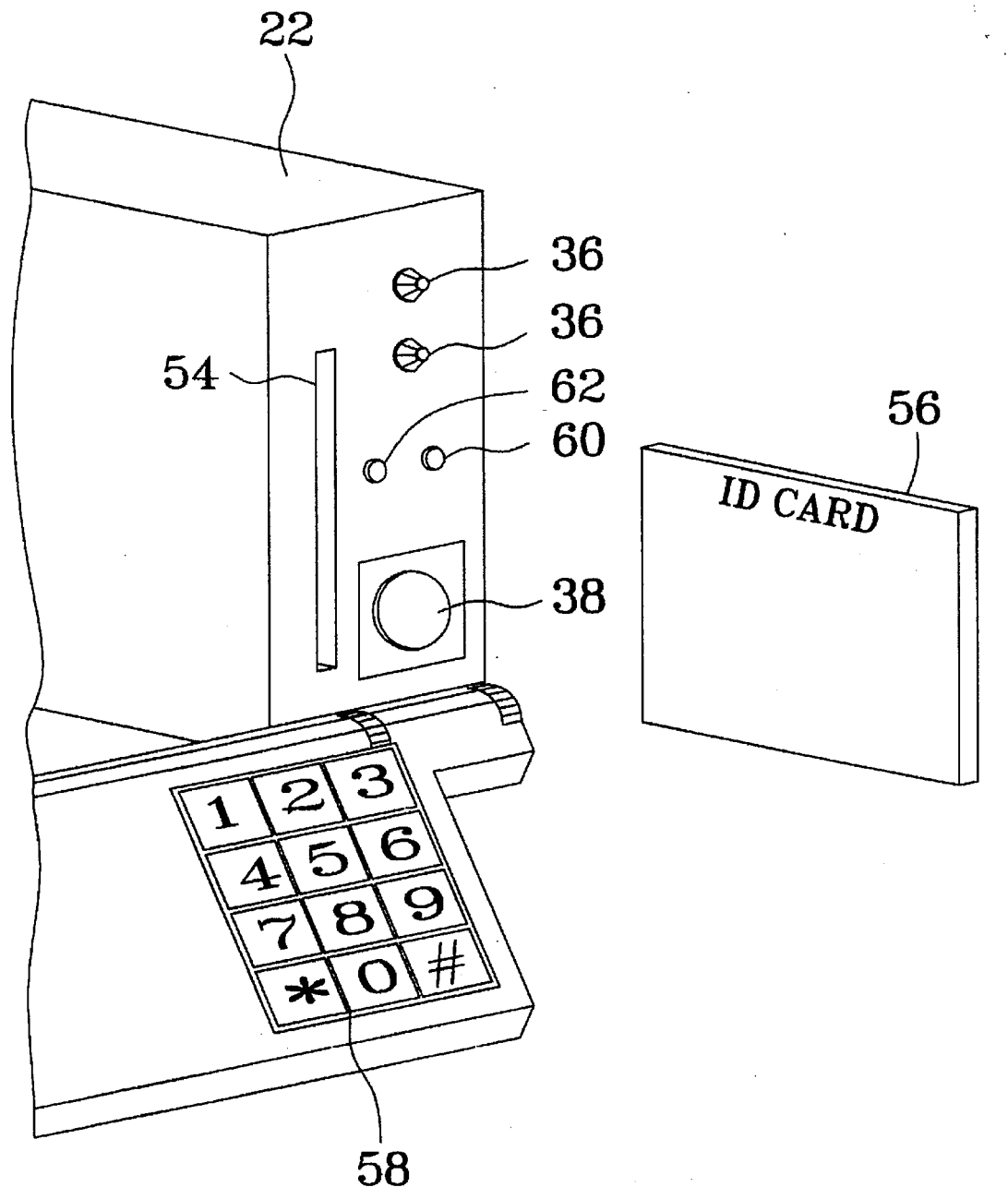
FIG. 5 shows an electronic shelf unit suitable for use in place of the shelf shown of the foregoing embodiments, which shelf unit is provided with access control features.

Referring to FIG. 5, optional access control features of electronic shelf unit 10 can comprise a card reader presenting a card slot 54 in side panel 22 to receive a user or vendor identification card 56 and a keypad 58 for entry of a user identification number or product identification information. For accuracy, product information is preferably entered by reading a bar code, but keypad 58 can be useful for entering miscellaneous codes and uncoded items.

Identification card 56 can be a smart card with memory or a processor, or both on board, and provide identification of the user, and their facility for use in billing. Alternatively, the card can be a customer or patient card enabling withdrawals automatically to be posted to the customer's account. An equivalent smart card can be employed by vendor's representatives, giving each access to their vendor's shelves and only their vendor's shelves. By including shelf ID's on such a vendor smart card 56, as well as a vendor ID, and requiring the card reader in electronic shelf unit 10 to recognize both ID's a high level of security for vendors is obtained.

Prominent red and green indicator lights 60 and 62, respectively, provide user communication to assist users interacting with the system during receipt or withdrawal of product items. Red indicator light 60 warns or errors and indicates cancellations. Green indicator light 62 acknowledges data entry and indicates a "ready" status. Other more sophisticated visual displays can be provided, if desired, and some applications may employ a significantly sized video display screen capable of displaying complex text and graphic images to communicate item descriptive, inventory status and shelf diagnostic or status information, and the like to shelf users and technicians. Simple icons may be used for common conditions such as low battery, full shelf, reporting out and so on.

Desirable also, but not shown, is an audible indicator to confirm receipt of appropriate data entries by the shelf unit 10 and to alert to inappropriate data entries or shelf conditions, for example, invalid codes or a low battery. Such an audible indicator may be as simple as a buzzer or beeper or as complex as digitized voice messaging which could be remotely vendor activated, if desired.

Preferably, electronic shelf unit 10 also comprises one or more internal, solenoid-activated mechanical shelf locks (not shown) to prevent unauthorized removal of product items, which lock can be electronically released by entry of a valid user identification code, and may include a mechanically keyed override for a manager to use in case of power or electronic failure.

As shown, keypad 58 is incorporated in front panel 24, shown opened and conveniently supported in an inclined position for numeric data entry. Optionally, keypad 58 can permit full alphanumeric entry or may be a pointer-based data entry device such as are used for personal digital assistants. To enable keypad 58 to be used to gain access to shelf unit 10, it may be double-sided (or another keypad may be provided) providing a keying area on outer surface 40 of front panel 24, when panel 24 is closed. As shown in FIG. 5, closure of front panel 24 covers card slot 54, enabling an easy-to-use two-stage access control procedure: keying of a numeric code in (outer) keypad 58, front panel opening followed by card entry.

The shelf lock (not shown) can operate on front panel 24. Thus, keypad 58 can be accessed with the shelf locked to permit front panel 24 to be opened when the shelf lock is released after entry of a valid code. Forward extension 64 provides a convenient alternative location for the electronic and mechanical components of electronic services 34 and for instructional, information or advertising messages. Other relative arrangements of the mechanical components of electronic shelf unit 10 will be apparent to those skilled in the art.

Use of electronic shelf unit 10

The use of electronic shelf unit 10 will now be described with reference to the access-controlled embodiment of FIG. 5. Equivalent procedures for the simpler embodiment shown in FIGS. 2–3 will be apparent to those skilled in the art, noting that, lacking means to input a withdrawer code, alternative means will be needed to account for withdrawn items. The following procedure is illustrative of the use of an invention embodiment having access control means, and many variations are possible.

In one inventory receipt procedure, when a product item 30 is placed on shelf 20, its presence is sensed and electronic shelf unit 10 automatically calls for input of a product ID. A typical procedure for loading the shelf is for a vendor's agent, or a hospital staff member, gain access to the shelf by entering their identification code through keypad 58.

If a valid code is entered, as determined by comparison of the code entered with a list of valid codes stored in shelf unit 10's electronics, or at a central location (not necessarily the vendor's facility) reached via supervisory unit 14 and infrared and telephonic communication, the buzzer sounds a continuous tone to prompt the user to open the shelf door.

At the same time, the shelf lock solenoid is released so that the shelf door can be opened. If a product item is not placed on shelf 20 and detected by sensing grid 32, green indicator light 64 will be illuminated and the beeper will sound to prompt the user to enter the ID code associated with the item, which ID code may be entered from keypad 58.

Optionally, in an alternative procedure, a product item 30 can first be scanned by a bar code reader (not shown) to convey the bar code into the shelf unit processor, illuminating green light 62 to tell the merchandiser to place the scanned product item 30 on the shelf 20.

Thus, in one product-receiving procedure, a product item 30 is first placed on shelf 20 of shelf unit 10 then an item-identification code is entered. In the alternative procedure, the code is entered, then an item 30 is placed on shelf 20. When code entry and all product loading are completed, shelf 20 is then closed. When the next polling signal is received via the shelf unit's infrared detector and antenna 36, shelf unit 10 transmits all of the transactions that have occurred in the shelf since the last such transaction.

In preferred embodiments, the unit 10 identifies the person who accessed the shelf 20 and identifies the product items 30 that have been placed on the shelf 20. Then the shelf unit 10 sends the identification code for the item followed by a plus or minus symbol to indicate whether the item was received or removed.

The vendor's system or computer 18 can post such movements of product items 30 onto and off shelf 20, to record inventory receipts and withdrawals and process them accordingly, billing the customer facility periodically as materials products are used and generating reorders as necessary, all of which can be fully automated with confidence in the status of the vendor's materials at the remote customer (or other) site. Clearly, the terms "vendor" and "customer" can describe other relationships between a provider of an inventory of product items or materials and a receiver, withdrawer or user of such items. The systems of the invention will be seen to have uses and applications that are not strictly between a buyer and a seller, but may be useful for example in tracking intra-company movements of materials between sites or facilities.

Similarly, where appropriate coding has been used, the customer's personal computer 42 can receive and process inventory movement information for multiple vendors and initiate billing of individual consumers, or patients.

Electronics for sensing grid 32

Figure 6:
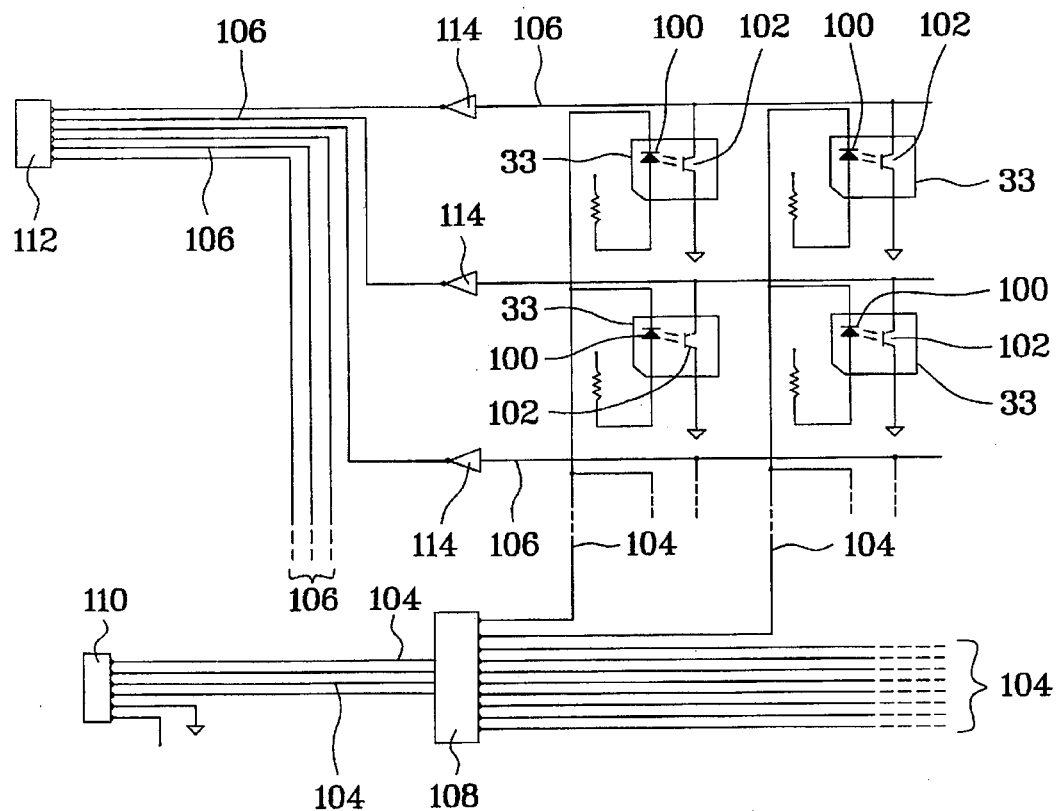
FIG. 6 is a schematic circuit diagram of a sensing grid for the materials monitoring system of FIGS. 1-5.

FIG. 6 shows schematically, in terms of an electronic circuit diagram, one possible construction of sensing grid 32 which grid 32 comprises an orthogonal array, or matrix, of rows and columns of sensors 33. Each sensor 33 is shown as comprising a preferably optical, emitter-detector couplet disposed side-by-side at a grid point and oriented for emissions, for example optical or acoustical emissions, such as ultrasound generated by an emitter 100, to be reflected from a product item 30 resting on or aligned beside or beneath sensing grid 32, and detected by companion detector 102.

Four such sensors 33 are shown in FIG. 6 as a partial representation of a grid section comprising ten rows of six sensors 33 each arranged in columns. As oriented in FIG. 6, the columns of sensors 33 are horizontal and the rows of sensors 33 are vertical. The sensor rows are connected by row conductors 104 and the sensors 33 in each row are connected in columns by column conductors 106.

Row conductors 104 lead via a scanning box 108 to a row port 110 for input of power and control signals and for output of sensed signals. Row port 110 monitors four row conductors 104 while scanning box 108 cycles across all ten conductors 108 to provide periodic sampling of all conductors 104, under microprocessor control.

All six column conductors 106 lead to a column port 112, via analog-to-digital signal discriminators 114, e.g. Schmitt triggers, for input of control signals and output of sensed signals.

The described six-by-ten array of sensors 33, with sampling of groups of 24 provides a convenient module for processing which module can of course be varied in size and can be repeated to any desired extent, with suitable connectors between modules to make up a sensing grid 32 to cover shelf 20 with sensors 33.

Conductors 104 and 106 can be run in strips along edges of sensing grid 32 and the whole is well suited to manufacture by layer deposition integrated circuit fabrication technologies and may include integral semiconductor components. In one attractive embodiment which employs modern flexible circuit technology, such for example as used by Intel Corporation in filmstrip production of PENTIUM (trademark) processors for notebook computers, sensors 33, conductors 104 and 106, and signal discriminators 114 are fabricated in a continuous flexible film, for example MYLAR polyester (trademark DuPont) which can be cut to size and terminated to fit any desired shelf 20.

Electronics unit 34

Figure 7:
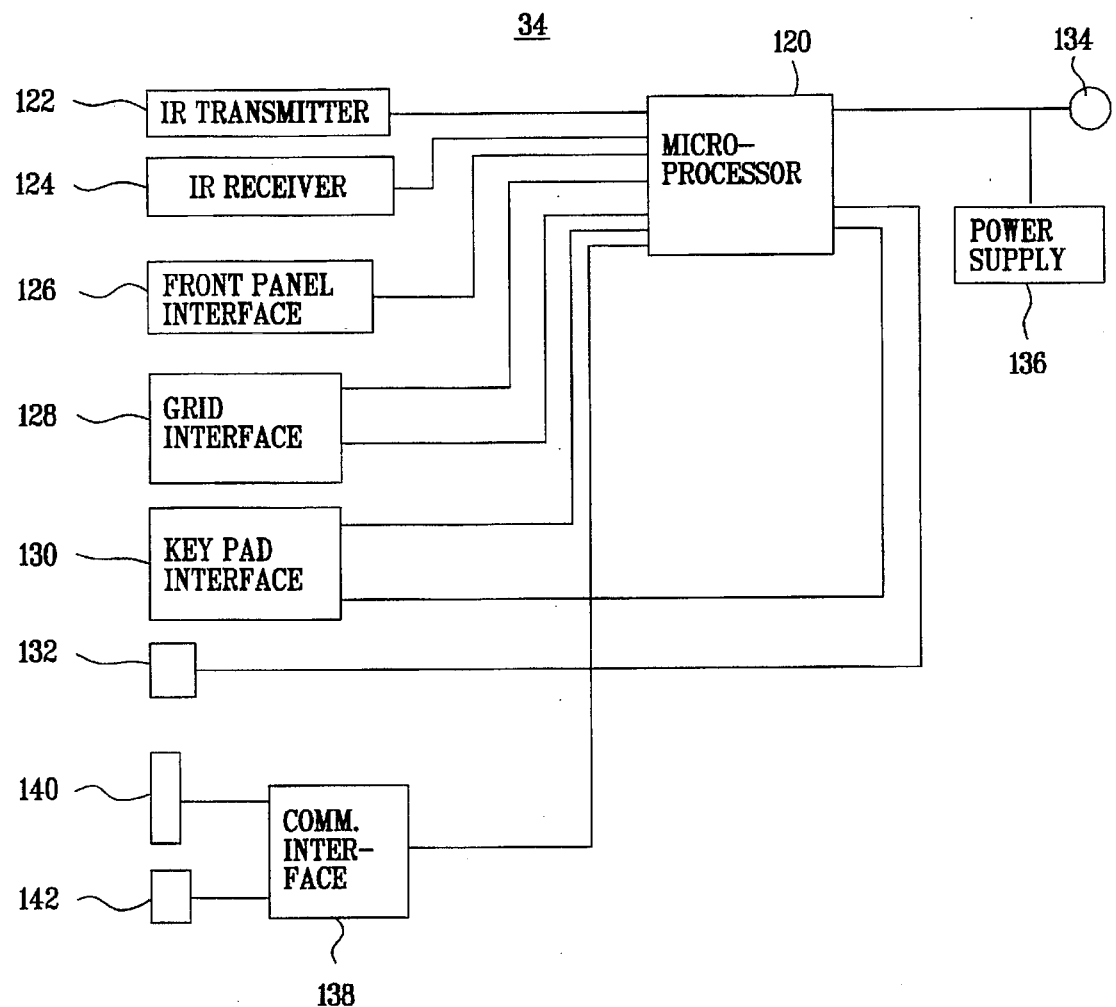
FIG. 7 is a schematic circuit diagram of an electronics unit for an electronic shelf unit such as that shown in FIGS. 1-5.

FIG. 7 shows schematically, in terms of an electronic circuit diagram, one possible construction of electronics unit 34 for shelf unit 10, which electronics unit 34 is preferably incorporated on a circuit board which can be assembled into side panel 22 of shelf unit 10.

Electronic processing is effected by a microprocessor 120 which is a center of electronics activity through which all input and output signals are channeled. Microprocessor 120 can be any suitable communications management and signal processing microprocessor capable of performing the functions described herein, for example, a Motorola model 68332 embedded processor.

Microprocessor 120 receives and transmits data to shelf supervisory unit 14 via an infrared transmitter 122 and an infrared detector or receiver 124 which components together constitute an IR transceiver, as referenced hereinabove, and use the transceiver for broadcast and reception of data messages encoded on infrared carrier waves.

User alerts and communicators such as indicator lights 60, 62 and an audible device are controlled through front panel interface 126. Grid interface 128 and keypad interface 130 are connected to microprocessor 120 to provide communication, respectively, with sensing grid 32 and keypad 58. Sensor signals from row port 110 and column port 112 are received by microprocessor 120 via grid interface 128.

Jack 38 for a bar code scanner or the like inputs to microprocessor 120 via bar code reader interface 142.

A shelf front panel 24 locking solenoid 132 is directly controlled by the microprocessor 120.

A communications interface 138 manages input and output functions between microprocessor 120 and a serial port 140, which can be accessed by local computer 42, and a bar code reader interface 142 for bar code reader 43.

Electronics for shelf supervisory unit 14

Figure 8:
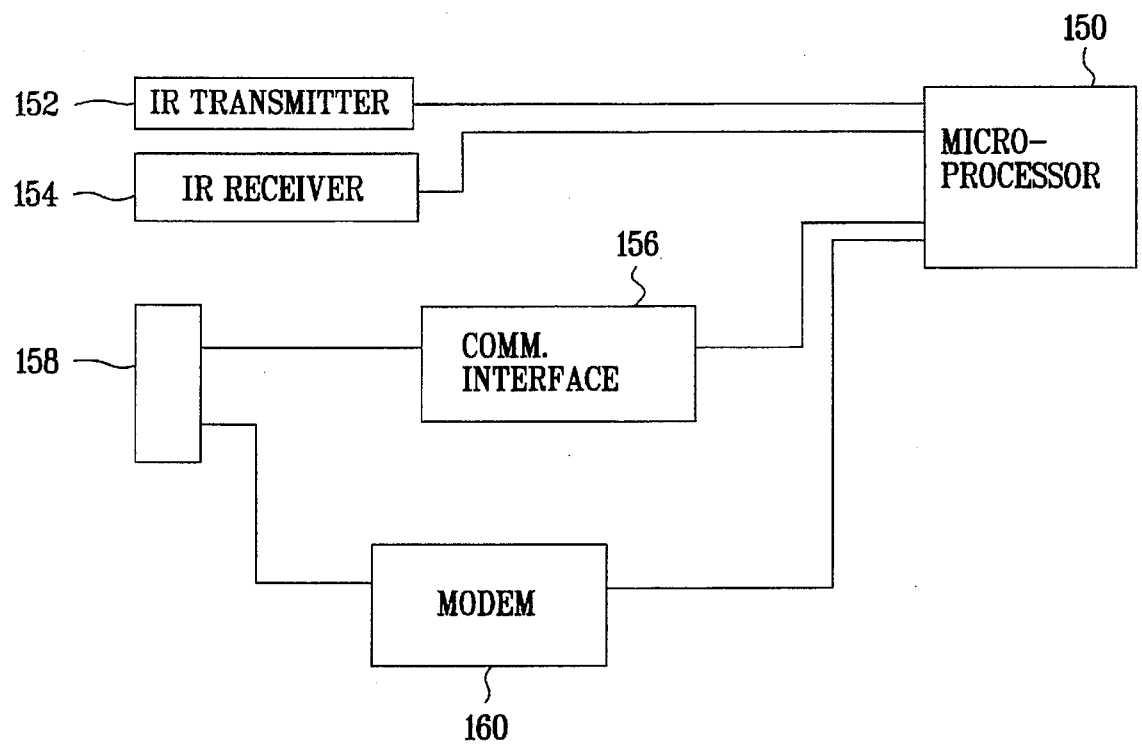
FIG. 8 is a schematic circuit diagram of a shelf supervisory unit for use in the materials monitoring system of FIGS. 1-5.

FIG. 8 shows schematically, in terms of an electronic circuit diagram, one possible construction of electronics for shelf supervisory unit 14 which electronics are preferably incorporated on a single circuit board.

Electronic management of optical communications with multiple shelf units 10 and telephone line communications with multiple vendors, as well as data feed to a local serial bus, are handled by a microprocessor 150. Microprocessor 150 can be any suitable communications management microprocessor capable of performing the functions described herein, for example, a Motorola model 68332 embedded processor.

Microprocessor 150 receives and transmits data to shelf units 10 via one or more infrared transmitters 152 and infrared detectors or receivers 154 which components together constitute one or more IR transceivers, as referenced hereinabove.

Serial communications are output through a communications interface 156 to a connector 158. Telephone line communications are handled by a dialer-equipped modem 160 which also outputs to connector 158. Connector 158 provides a power source and connects with umbilical connector 44 to deliver communications output at or about floor level.

Inventory sensing program

The invention utilizes an inventory sensing program, hereinafter referred to as the "program" to analyze displacements of items 30 on shelf 20 and to maintain an accurate accounting of stock. The program utilizes a minimum of three data-storage matrices; a temporary storage matrix for current data, hereinafter referred to as the "current matrix", that is used to temporarily store data read in from the sensing grid 32 of the invention during the run of the program; at least one data storage matrix for previously stored data, hereinafter referred to as the "previous matrix", that contains a map of the entire sensing grid 32; and an item stack matrix, which could be a one-dimensional array, of descriptions of items on the shelf, hereinafter referred to as the "item stack matrix."

The previous matrix is a large matrix corresponding in size to the number of sensors 33 of the entire sensing grid 32 of the shelf. In alternative embodiments, and depending on the size of the sensing grid 32 and the storage capacity associated with the implementing computer, for example microprocessor 150, the previous matrix may be one large matrix or be comprised of many sub-matrices. In a preferred embodiment for most computer systems, the previous matrix can be considered as being comprised of many sub-matrices, each corresponding in size to the current matrix. The preferred configuration for the particular system in use will be apparent to any person of ordinary skill in the art.

In one embodiment, the current matrix is two-dimensional with six columns and four rows of data cells. These dimensions may be expanded by increasing the scanning and transmitting capability of the data input ports attached to the sensing grid 32, and other relevant system capabilities. Each data cell in the previous matrix corresponds to one optical sensor 33 location, herein described as a "pixel", on the grid 32. In alternative embodiments, depending upon the items to be located and inventoried, sensing grid 32 may be designed to be sensitive to changes in pressure, heat, or other forms of electromagnetic reflections or emissions, or any other suitable physical phenomenon.

The current matrix is a temporary data storage matrix that is re-initialized after being filled with data from the corresponding locations on the shelf sensing grid 32 and compared to a corresponding sub-matrix or data locations in the previous matrix. The previous data matrix is initialized only once at the start of the first run of the program. After the first complete run of the program, the previous data matrix contains an entire map of the grid 32 on the shelf. In subsequent runs of the program, selected sub-matrices or data locations in the previous data matrix are extracted by the program and the data values are compared to those in the current matrix.

The item stack matrix contains such information as is necessary to uniquely identify each item, and is keyed to a location on the grid. Item descriptions are input by the vendor's representative or other technician at the time of initial placement of the item on the shelf, which input may be accomplished by optical scanning of a bar code on the package of the item, or by manual input via a conventional keyboard, mouse, pointer light pen or other manual input device, as described above. If desired, item descriptions can include physical characteristics such as the shape, size, weight, and so forth of each package or codes therefor.

As will be described more fully below, a feature of the invention is the use of ports attached to grid 32 to transmit data gathered from the sensor locations on the grid to RAM. The program then stores the value of each pixel of data in a corresponding location in the previous matrix, and compiles an internal map of the entire grid. In this way, movements of items on the shelf can be easily detected by reference to the internal map, and movement locations can be cross-referenced to the item stack matrix for item identification.

The current matrix has dimensions corresponding to the transmission capability of column and row ports 110 and 112, respectively, which in one embodiment are six columns and four rows, but can be expanded according to the embodiment. Column port 112 transmits column data, and row port 110 scans the rows, as described in more detail hereinbelow. Using a coupled emitter-detector type of optical sensor 33, if an item is placed on the sensing grid 32 above an optical sensor 33 location, the light-emitting sensor 33 detects a reflection back and the data value transmitted through ports 110 and 112, when that location is scanned, will be a default low value, or "0". If no item is above a particular sensor 33 location, no reflection back is received and the data value transmitted from the grid 32 for that location is high or "1". The data values of "1" or "0" may be switched or varied in alternative embodiments.

A valuable feature of the program is its flexibility of application. It is not designed exclusively for any particular operating system, programming language or computer architecture. A person of ordinary skill in the art can render the program compatible within many conventional computer architectures or operating system environments, utilizing conventional programming languages. In a preferred embodiment, the program is permanently encoded in firmware, and can be modular in design. A modular firmware program embodiment, as described herein can enhance manufacturing efficiency and minimize the need for user interaction through a conventional input device, such as an optical bar code scanner, keyboard, mouse, light pen or similar manual input device, yet still allow for flexibility in updating the code by providing a program override capability permitting manual modification of software, and allowing physical swapping of functional firmware modules.

Figure 9:
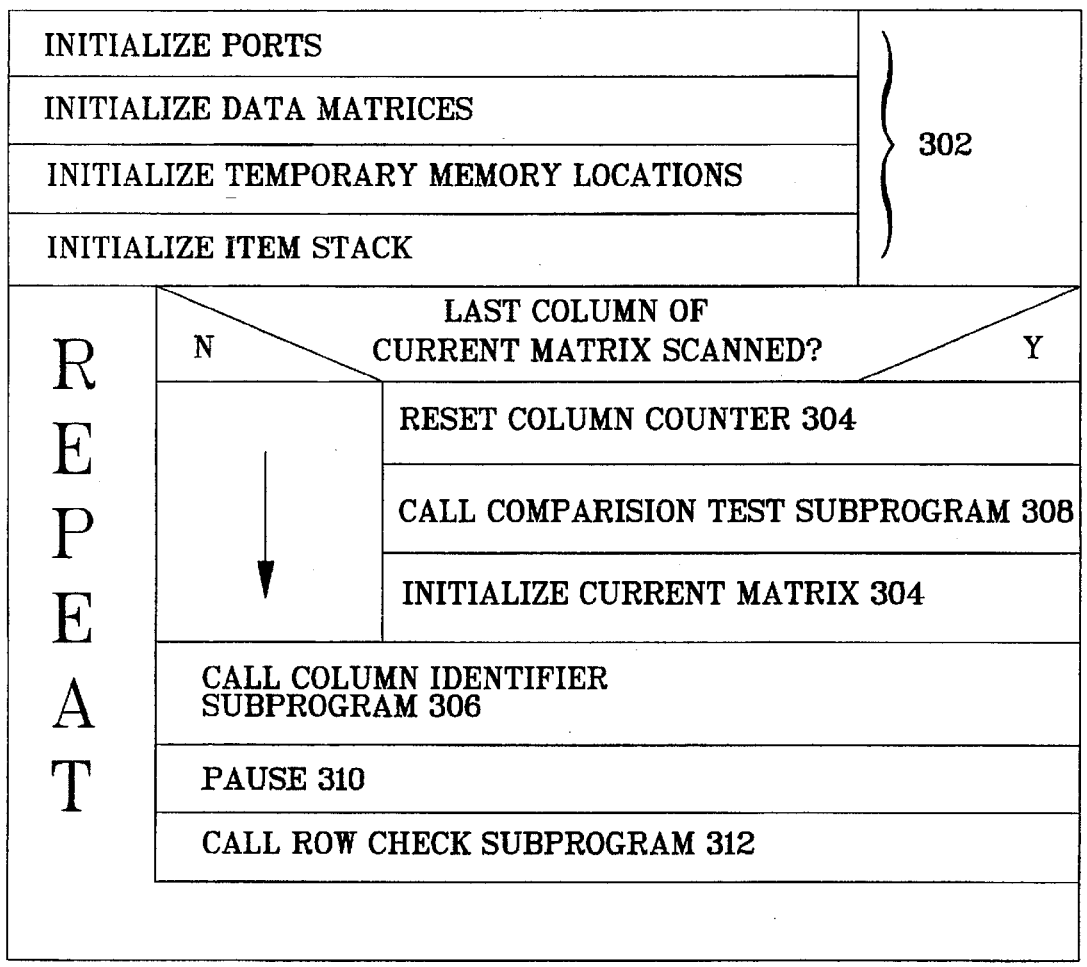
FIG. 9 is a schematic block flow diagram of an inventory sensing program.

Referring to FIG. 9, inventory sensing program 300 can call, in one modular embodiment, five subprograms, which subprograms, in alternative embodiments, can be integrated with program 300 or with each other, without loss of functional effect. The preferred functional module design of program 300, as illustrated, enables flexibility in expansion, replacement or modification of discrete functional program modules and also enables individual testing of modules without involvement of program 300 control or other subprogram logic.

A first run of inventory sensing program 300 begins with an initialization sequence 302 to initialize column and row ports 112 and 110, respectively, the current and previous data matrices, the item stack matrix and all temporary memory locations, including flags and counters, used during the run of the program. Initialization sequence 302 for the first complete run of the program sets all data cell locations of the above-mentioned matrices, ports, item stack and temporary memory locations, including flags and counters, to their respective initial default values. Re-initialization sequence 304 of selected flags and counters as well as of the current matrix is commanded at various stages during a run of program 300. Initialization at the beginning of subsequent runs of program 300 is achieved by setting all data cell locations of the current matrix, ports, and temporary memory locations, including flags and counters, to their respective default values, to avoid the possibility of previously stored data corrupting the current run. During subsequent runs of program 300, the previous data matrix and item stack descriptive matrix are not re-initialized, but merely updated during the run to reflect the most current status of sensing grid 32.

In addition to the necessity of running initialization sequence 302 to initialize all above-referenced locations at the start of a first program run, initialization sequence 302 of all data locations in the current and previous data matrices and re-initialization sequence 304 of the current matrix to a high default value of "1" is important in this embodiment because low data locations having "0" value are flagged during a comparison made between the current and previous matrices and the flagged sensor 33 locations are used to properly update the item inventory map of the shelf to determine if an item has been moved, added to or removed from the shelf. Other temporary data locations are initialized to the default value of "0" or other desired values at the start of the first run. Alternative embodiments may have different default settings or a different number of flags or counters if desired.

Figure 10:
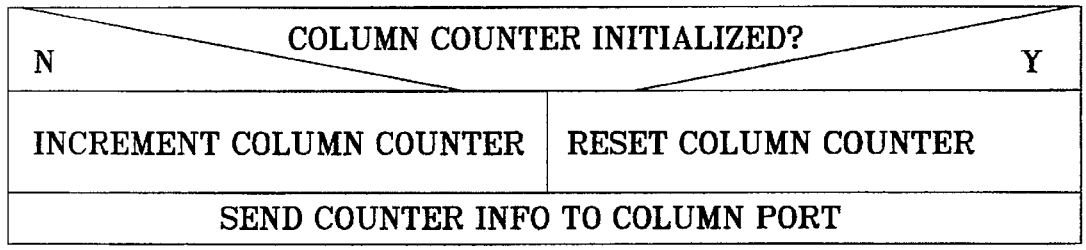
FIG. 10 is a schematic block flow diagram of a column identifier subprogram.

After initialization 302 is complete in the first run of program 300, program 300 then identifies a starting location on the grid 32 by calling column identifier subprogram 306, shown schematically in FIG. 10, which subprogram increments the column counter by a value of one and sends the updated information to column port 112. In response, column port 112 shuts off the data flow from the previous column location in sensing grid 32 and enables data from the next column in grid 32 to flow through column port 112 and be read into the corresponding column in the current matrix. Before a column of data is fed into the current matrix from the corresponding location on grid 32, program 300 checks the column counter to see if its value is equal to the total number of columns in the current matrix, by comparing it to an index internally set to the total number of columns in the current matrix, which number varies according to the embodiment.

Figure 11:
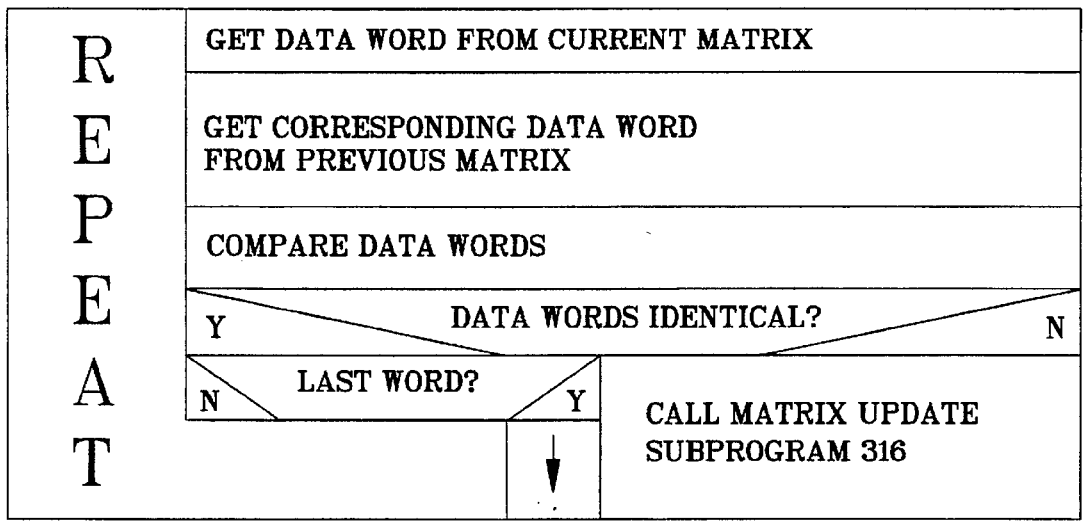
FIG. 11 is a schematic block flow diagram of a comparison test subprogram.

If the current matrix is filled, the column counter value is reset to zero, and program 300 then calls comparison test subprogram 308, shown schematically in FIG. 11. If the current matrix is not yet full, program 300 executes a pause 310 for the time required to read and store one column of data from grid 32, which pause is, in one embodiment, approximately 1 millisecond ("ms") for 4 data cells, and which pause 310 may vary depending upon the particular embodiment.

Figure 12:
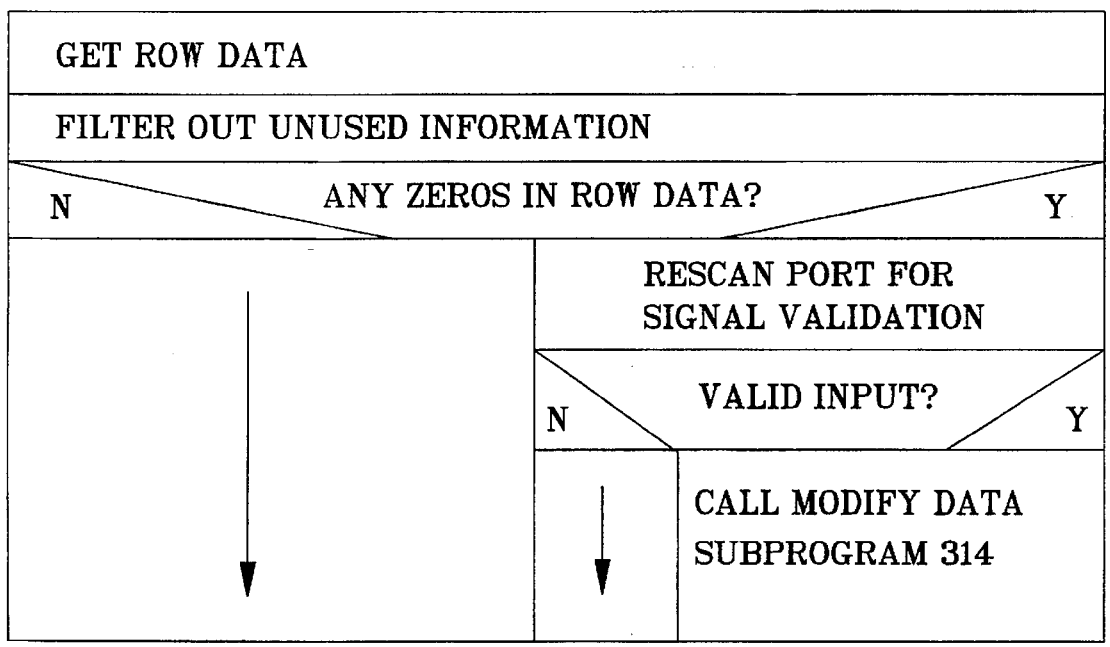
FIG. 12 is a schematic block flow diagram of a row check subprogram.

During pause 310 in program execution, program 300 commands row port 110 to scan the rows in the grid corresponding to the rows in the current matrix, by calling row check subprogram 312, schematically represented in FIG. 12. The purpose of row check subprogram 312 is to verify data input by column port 112, and to determine the stability of the grid data. Thus, if items 30 are moved around, removed from or added to shelf 20 while data is being read through column port 112, row-check subprogram 312 will update the current matrix data as the changes are occurring. Before modifying data in the current matrix, row check subprogram 312 verifies a change by repeatedly scanning the rows, for example, twenty times, with a short delay between scans. Functionally, row check subprogram 312 gathers row data from locations on grid 32 that correspond to data locations in the current matrix, filters out all high data values from the data stream and identifies row locations containing low data values.

Figure 13:
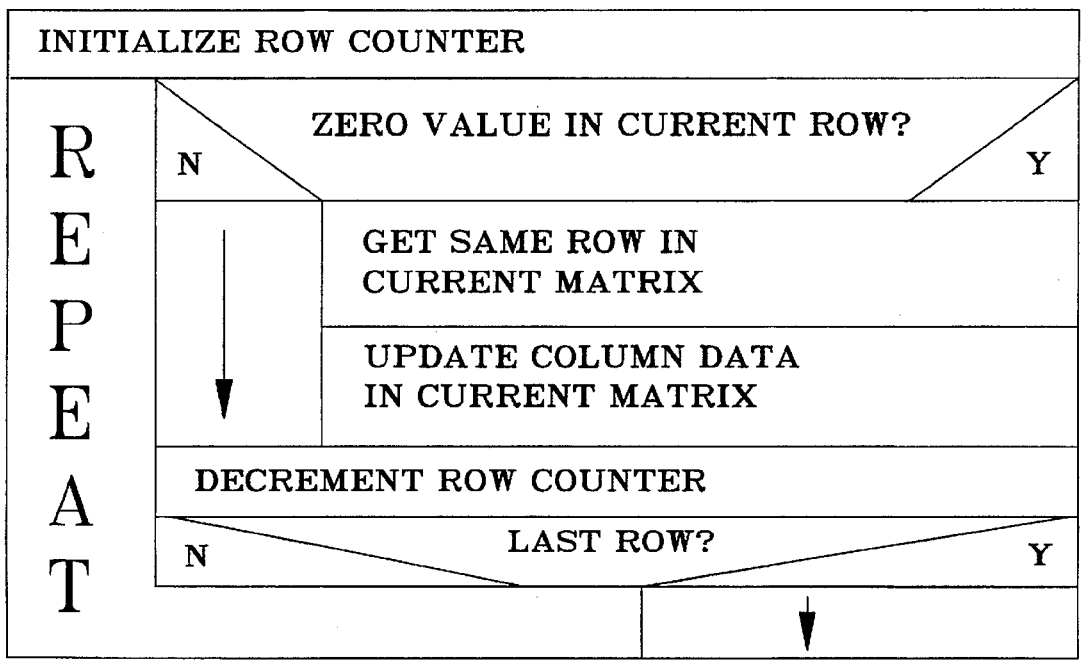
FIG. 13 is a schematic block flow diagram of a modify column data subprogram.

If any rows are found to contain low data values, row check subprogram 312 then calls modify column data subprogram 314, schematically represented in FIG. 13. The function of modify column data subprogram 314 is to set a data location in the current matrix to zero based on row scanning performed after the reading in of column data, which ensures that changes in data occurring while the current matrix is being filled are properly recorded.

Referring back to FIG. 9, program 300 repeats the above-referenced processes until all columns in the current matrix have been filled. If the current matrix is not yet filled, column identifier subprogram 306 continues to increment the column counter and read in columns of data from grid 32. When the current matrix is full, program 300 then re-initializes the column counter to zero and calls comparison test subprogram 308, schematically represented in FIG. 11. Comparison test subprogram 308 checks each data cell, word-by-word, for differences in value between the current matrix and the previous matrix. Locations for each word of data in the current matrix are identified by a pointer, or counter, initialized to the starting location in the current matrix and incremented as the comparison proceeds. The corresponding locations in the previous matrix are calculated arithmetically from the pointer in the current matrix. If a data word is found to be different, the comparison test ends and the differences in the current and previous matrices are analyzed for movement, addition or deletion of items 30 from shelf 20.

Figure 14:
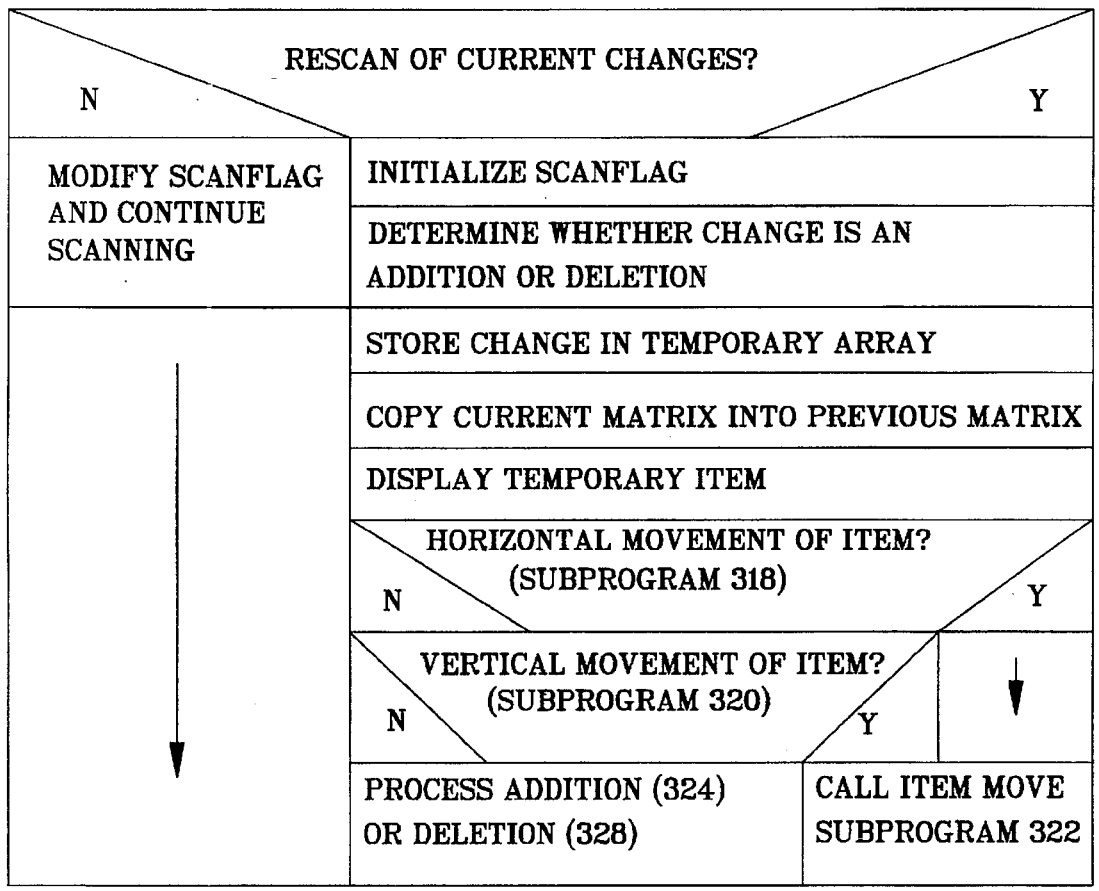
FIG. 14 is a schematic block flow diagram of matrix update subprogram.
Figure 15:
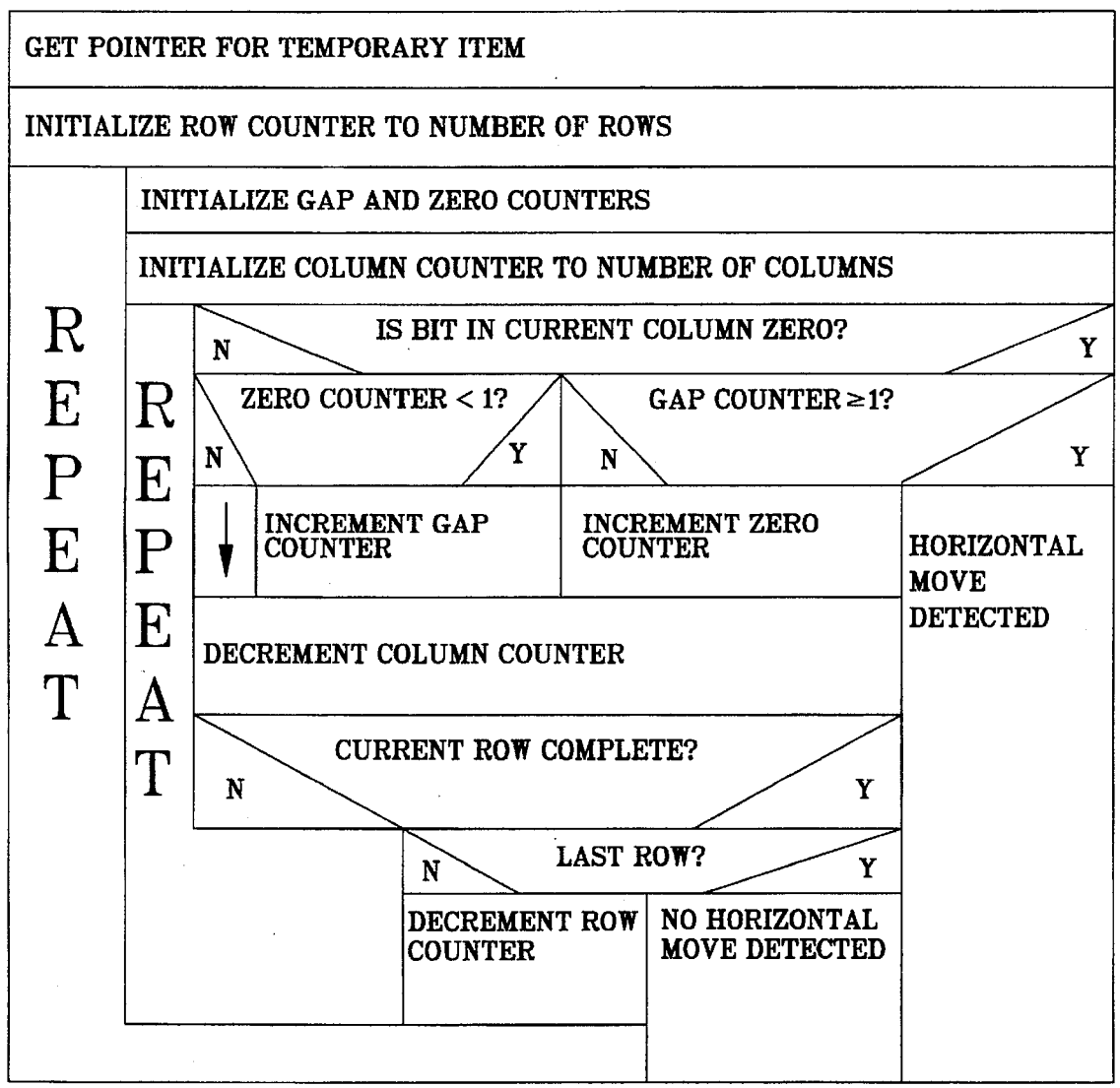
FIG. 15 is a schematic block flow diagram of a horizontal movement subprogram.
Figure 16:
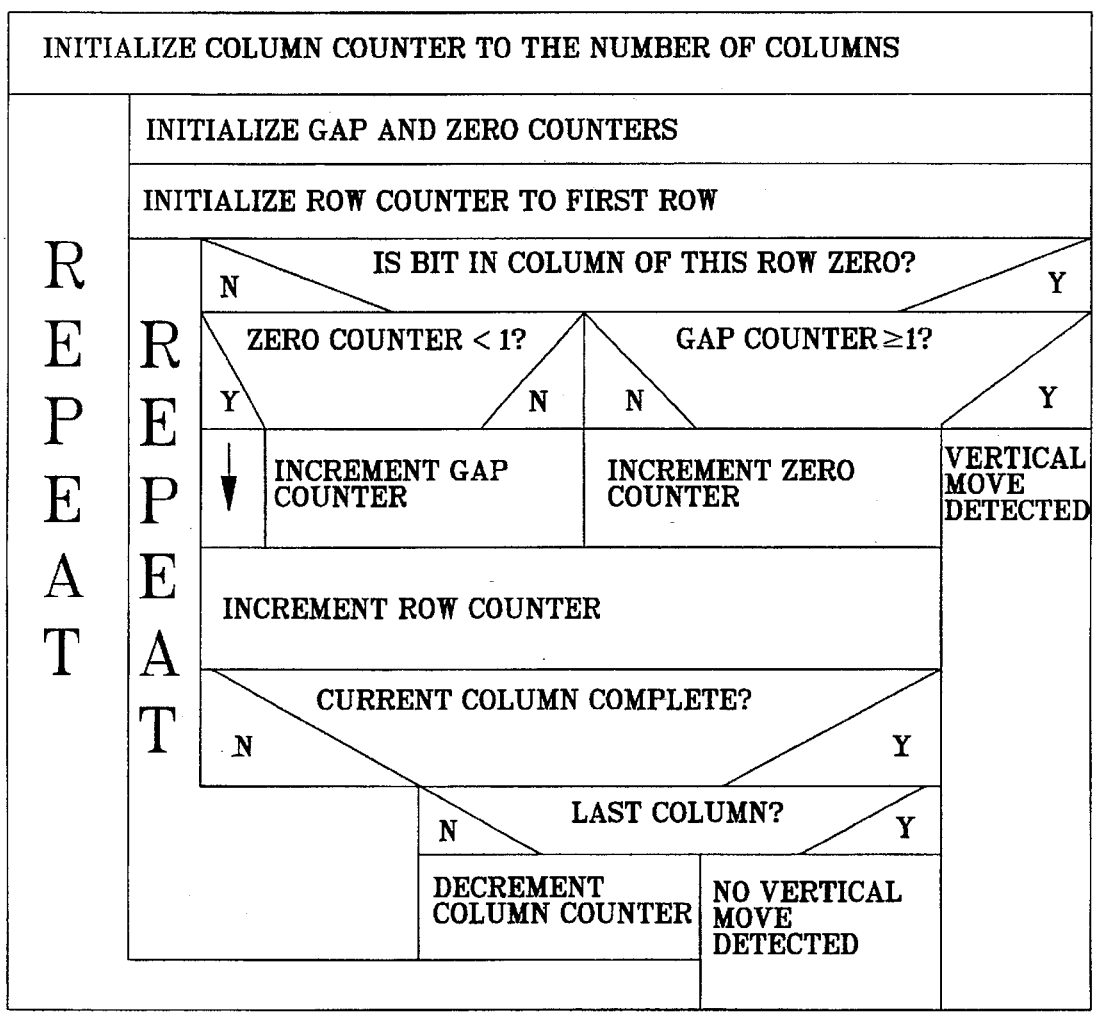
FIG. 16 is a schematic block flow diagram of a vertical movement subprogram.

Program 300 accomplishes this determination by calling matrix update subprogram 316, schematically represented in FIG. 14. Matrix update subprogram 316 first checks the item stack array to verify that the item had not been added to or removed from shelf 20 since the last run of program 300. If item 30 is found to have been added to or deleted from the item stack array, the corresponding locations in the current matrix are bypassed. Matrix update subprogram 316 stores the remaining locations of differences between the current and previous matrices in a temporary array and writes the current matrix onto the corresponding locations in the previous matrix. Matrix update subprogram 316 then tests the difference array for horizontal and vertical movements in shelf items 30, by calling horizontal movement subprogram 318 and vertical movement subprogram 320, schematically represented in FIGS. 14 and 15, respectively. The terms "horizontal" and "vertical" are here used to reference orthogonal directions in the storage plane of shelf 20, which plane is generally horizontal.

Horizontal movement subprogram 318 detects motion along the rows with allowance of a gap of no more than one pixel difference between the current and previous data matrices. This gap allowance can be in fixed or modifiable format and modified in alternative embodiments to reflect, for example, differences in resolution of grid 32, or in sizes of items 30 on shelf 20.

Vertical movement subprogram 320 is then called which is functionally equivalent to horizontal movement subprogram 318, except the movement detection algorithm operates on column data instead of row data. The combination of these two subprograms can operate as an edge detection algorithm, to construct an outline, or shelf footprint, of an item 30 comprised of the image formed by the sensors 33 that respond to the presence of item 30 on grid 32. This outline image can be stored and the system can compute and store the location of the centroid of the item's shelf image, or footprint. Alternative embodiments that are functionally equivalent to these two motion detection algorithms can be created by those skilled in the art to compute, for example, optical centers, centers of gravity, and so forth, for different types of sensor mechanisms.

The closeness with which the outline of an item 20 determined by program 300 corresponds with an actual visual outline will depend upon the resolution of grid 32. Preferably, a sufficient density of sensors is provided to map an item's shelf image that an average of at least eight, more preferably at least sixteen sensors 33 is occluded by each item 30 on shelf 20, as the item 30 is moved across the shelf. Higher densities of sensors 33 in grid 32 may produce a more precise image but elevate costs not only for grid 32, but also for the significantly greater data processing capabilities needed by geometrical increases in sensor numbers. The objective of the sensing system is not so much to obtain accurate images of items 30 on shelf 20 as to distinguish one item from another on the shelf, referencing the descriptive and locational information input when receiving items to the shelf. Relatively low sensor resolutions of the order of one to five sensors per inch can provide adequate information in an economical manner.

By reference to differences in data locations between the current and previous data matrix locations stored in the temporary differences array, horizontal and vertical movement subprograms 318 and 320, respectively, it can be determined whether a horizontal or vertical displacement of an item 20 has occurred.

Figure 17:
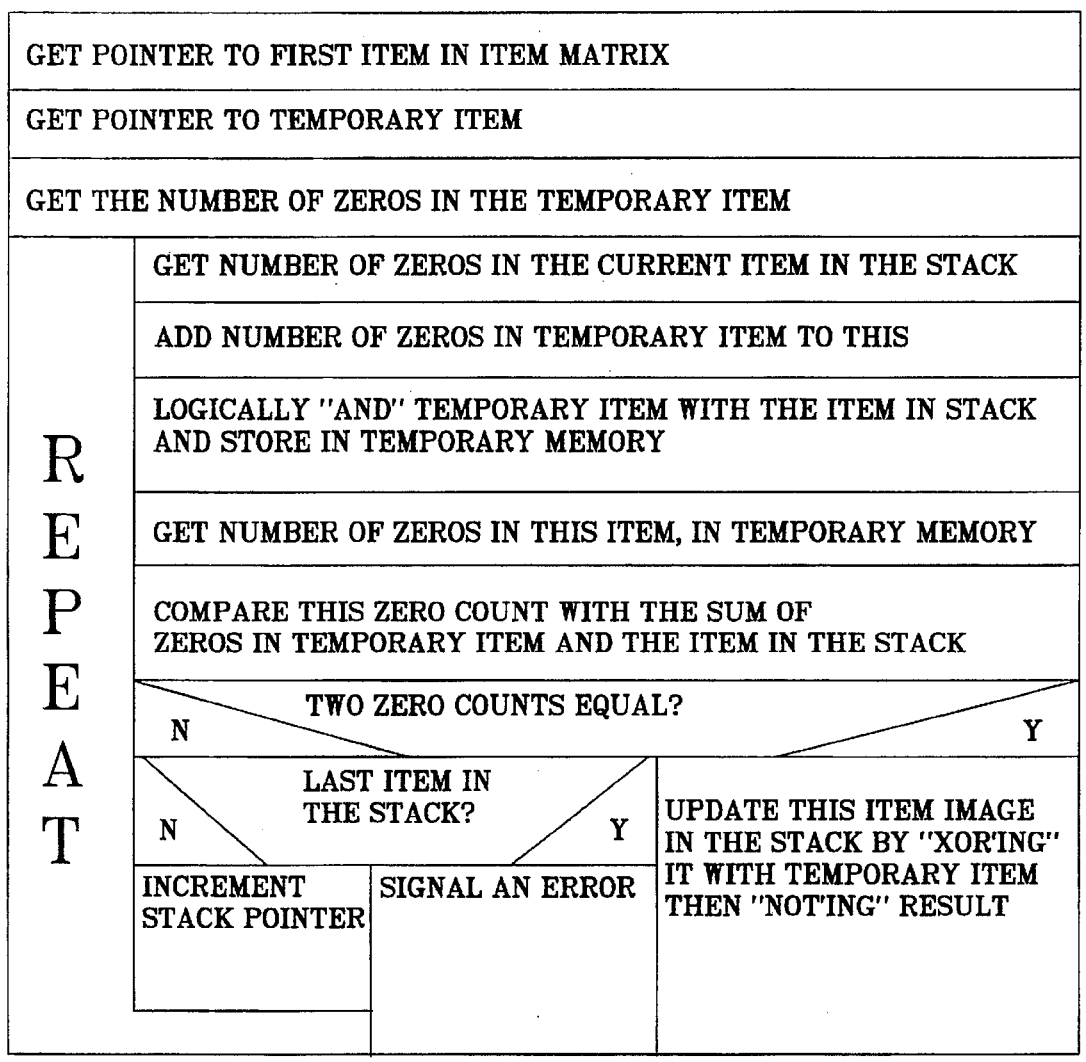
FIG. 17 is a schematic block flow diagram of an item movement subprogram.
Figure 18:
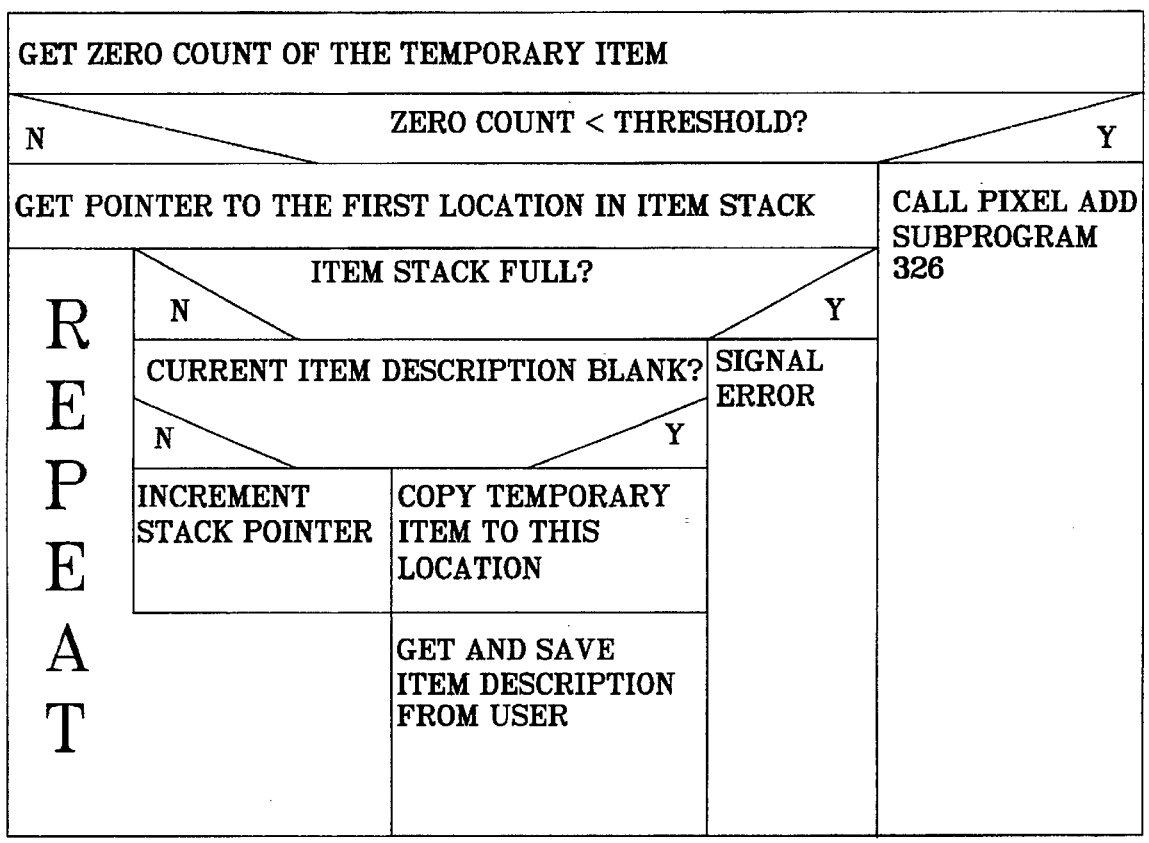
FIG. 18 is a schematic block flow diagram of an item add subprogram.
Figure 19:
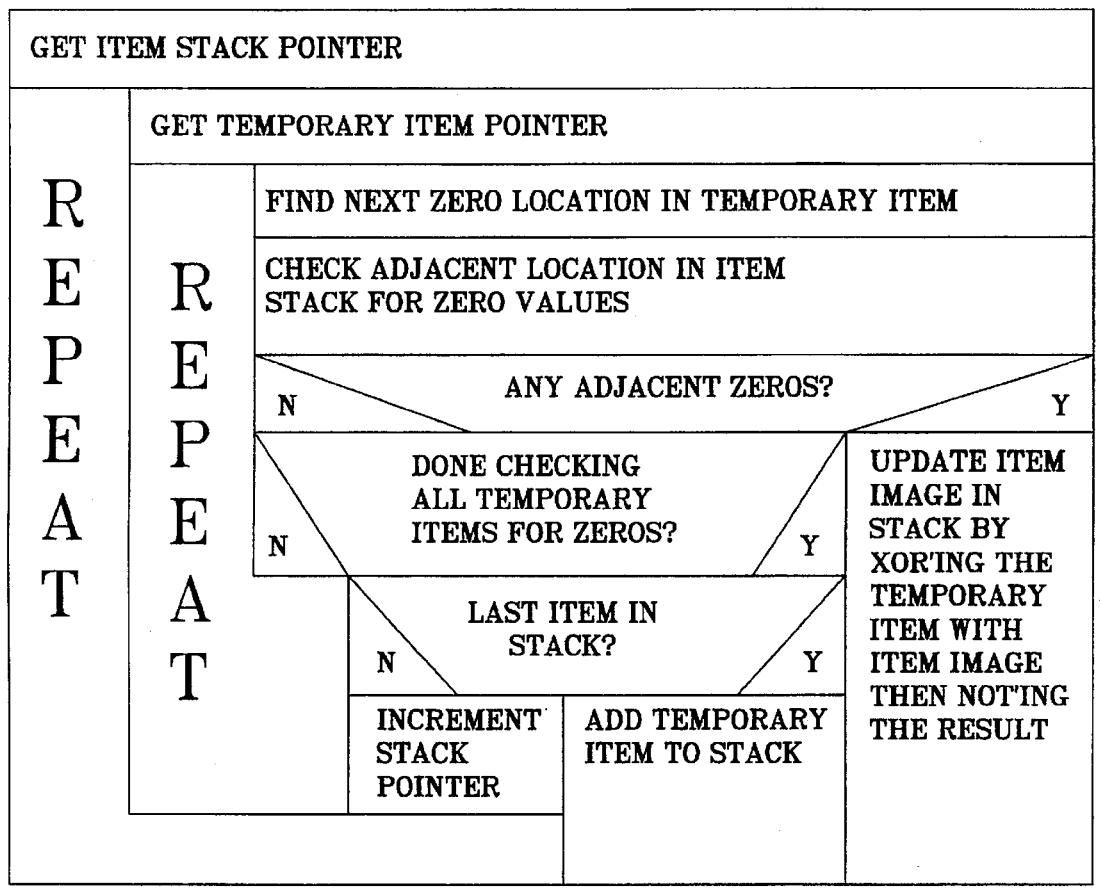
FIG. 19 is a schematic block flow diagram of a pixel add subprogram.

If either type of movement has been detected, matrix update subprogram 316 then moves the item image in the previous matrix by calling item move subprogram 322, schematically represented in FIG. 17. By reference to centroid locations of items 20 stored in the descriptive item stack array, matrix update subprogram 316 then moves the item by checking each item description in the item stack and identifying a centroid location within two pixel spacings of the computed centroid of the displaced item. The size of the allowed displacement in pixels, or sensor 33 locations, can vary depending on the embodiment. In alternative embodiments, computation of a centroid is not crucial to the functional effect; for example, overlap of item outlines can be analyzed, compared and updated in similar fashion.

If an item is merely rotated on sensing grid 32, and neither removed nor laterally displaced, pixels representing marginally located sensors around the periphery of the shelf image of the rotated item may be added or deleted to or from the pixel image of the item. The centroid of the item's image is not moved and these pixel additions and deletions are not of interest to the system but constitute "peripheral noise" which preferred algorithms are designed to accomodate by adding or deleting such pixels from the pixel image.

Referring back to FIG. 14, if matrix update subprogram 316 detects neither a horizontal nor vertical displacement of item 20 on shelf 30, then the subprogram checks for rotational motion of the item and addition or deletion of the item. First, item add subprogram 324 is called to determine whether the shelf location was previously empty or partially occupied. Item add subprogram 324 accomplishes this by testing the value of the zero counter set during the run of horizontal and vertical subprograms 318 and 320, respectively.

If the number of zeroes is below a pre-set threshold value, which can vary depending on the embodiment, this indicates a new item has been added to the stack. The item stack matrix is checked for a blank location, and the program prompts the user to input item descriptive information, which is then stored in the blank item stack location. If the item stack is full, an error is signalled.

Figure 21:
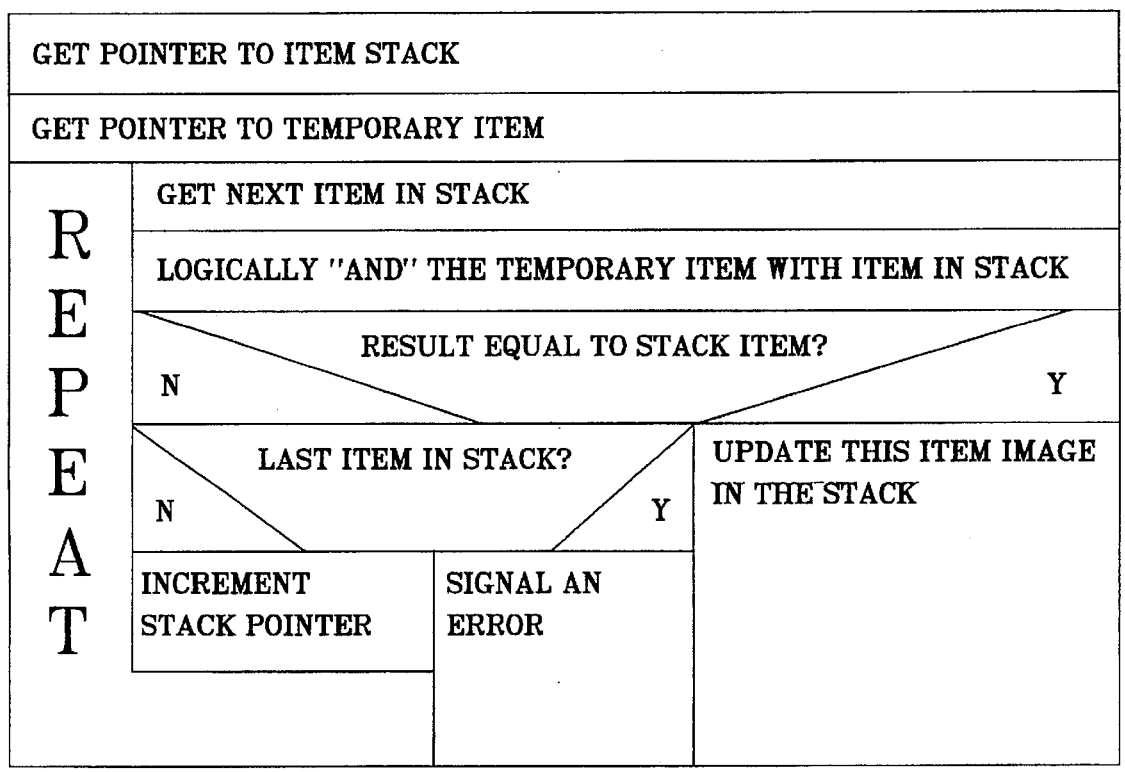
FIG. 21 is a schematic block flow diagram of pixel subtract subprogram.

If the number of zeroes is above a threshold value, item add subprogram 324 calls pixel add subprogram 326, schematically represented in FIG. 21. The function of pixel add subprogram 326 is to determine whether the item has been rotated or moved in such a way as to only add an insignificant number of sensor 33 detections to the map of the same item 20. This effect may also occur if a proximate item has been slightly moved in such a way as to impinge on the first item's previously identified sensor 33 locations. Pixel add subprogram 326 computes an outline based on the new data, and may also compute a centroid, depending on the embodiment, and compares this outline with the descriptive item information stored in the item stack array. Pixel add subprogram 326 then updates the item description in the item stack array if a match is found, or adds a new item to the stack.

Figure 20:
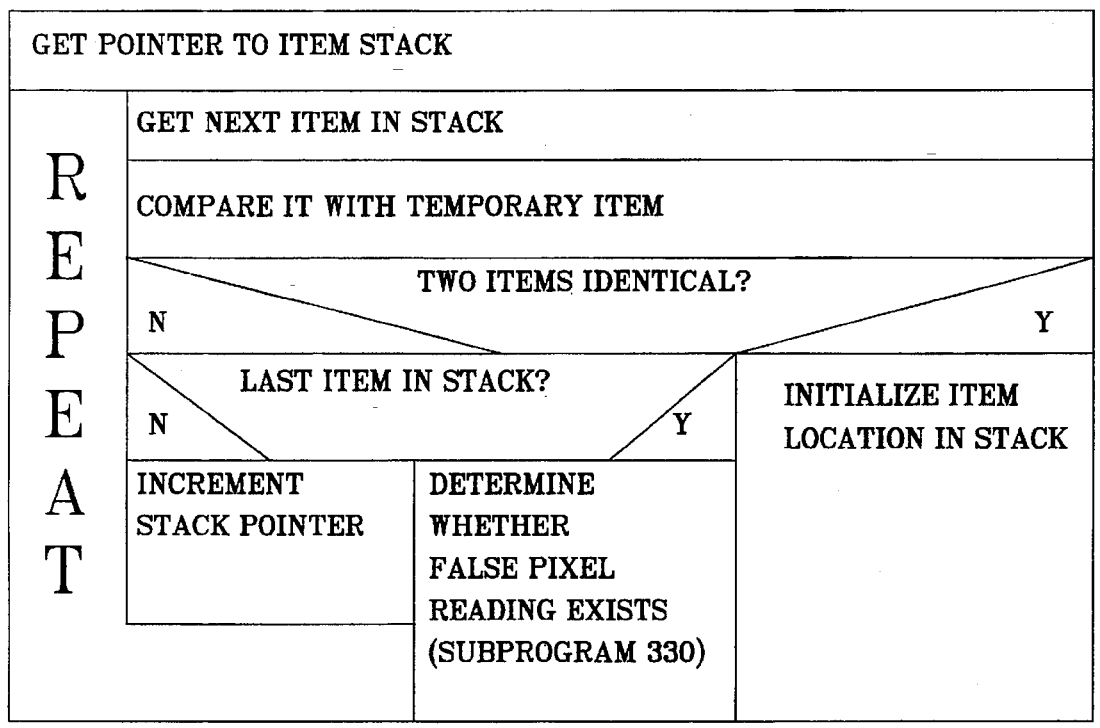
FIG. 20 is a schematic block flow diagram of an item delete subprogram.

In similar fashion, matrix update subprogram 316 checks for possible removal of an item 30 from shelf 20 by calling item deletion subprogram 328, schematically represented in FIG. 20.

Item deletion subprogram 328 compares the temporary item with the items in the item stack array and determines if they are identical. If they are, the item in the item stack is deleted by blanking the item stack location. If the two items are not identical, item delete subprogram 328 calls pixel subtraction subprogram 330 to determine if the item had been rotated or moved in such a way as to only lose an insignificant number of sensor 33 locations. If such a move is detected, the item stack description is updated with the new information.

As suggested above, preferred algorithms have the ability to accomodate detected additions and removals of peripheral pixels that consitute "peripheral noise" induced by rotational movement of an item.

Referring back to FIG. 9, when every word of the current matrix has been compared with the corresponding location in the previous matrix, program 300 re-initializes the current matrix's data cell values using re-initialization sequence 304, and the column location pointer is set to the next column location in the sensing grid 32, which location corresponds to the top of the first column in the re-initialized current matrix. The process as outlined above of filling the current matrix, comparing it to the previous matrix data, determining if movement has occurred, and updating the previous matrix is repeated until all sensor 33 locations on the sensing grid 32 have been read, compared and updated in the previous matrix. This completes one run of program 300.

During subsequent runs of program 300, only the previous data matrix and the item stack matrix are not re-initialized at the beginning of a run. Each subsequent run of program 300 completely updates the entire grid 32, and may, in one embodiment, be automatically and continuously run to keep the shelf inventory map current to within the time required for one program 300 run. Subsequent runs of program 300 can be timed to run at pre-programmed intervals of minutes, hours, days or weeks, and so forth, or only in response to a user command or command from another device, received for example, from shelf supervisory unit 14.

An alternative embodiment utilizes an external detector, for example, a suitably mounted emitter-detector infrared or acoustical scanner, operative on radar principles, to scan a shelf intermittently and detect movements of items on the shelf as they occur, or detect the presence of a person near the shelf and trigger a run of program 300, or flash warning signals, or trigger alarms if a proper code is not input promptly into a shelf security device. The advantages of such a security mechanism are important in an industry where stocked items are scarce or expensive or dangerous in the wrong hands. The infrared scanner can, in a modified embodiment, incorporate a transceiver to be able not only to detect changes in the grid but also to transmit messages to the vendor, via supervisory unit 14. Program 300 can also be modified to electronically transmit messages of detected changes in grid 32, failures of individual sensors 33 or other components, as well as to provide accountings of the movement of items to a remote vendor via a network or telephone link, as described hereinabove. In a modified embodiment, transceiver 122–124 can be linked to the computer system and serve as an alternative data input point to feed program 300 data, directly from a vendor or in response to locally generated signals, which could be produced by the vendor's representative or a supervisor, for example on a portable device, to supply primary or backup data for testing, and as a backup in the event of failure of peripheral components of shelf 20 such as keypad 58.

The advantages of intermittent runs of program 300 over continuous runs are energy conservation, electrical bill savings and extension of component life. Between runs, sensors 33 and other electrical components can be turned off.

SUMMARY

The systems of the invention, as described herein provide new methods of monitoring inventories of product items stored on shelves or other areas which methods are less labor intensive and more accurately report actual inventory movements, especially withdrawals, than has heretofore been possible.

The novel electronic shelf units of the invention are able to sense actual product item movements from the point of storage. Because the system can know the identity of every item stored, using information provided to the system when the item is received into storage, no subsequent item identification step is necessary, as is the case with conventional inventory monitoring methods. Reliable billing and accounting can be generated merely by having user's enter a personal ID authorizing removal of items. The time, inconvenience and uncertainty that may be introduced in checking out items are all eliminated.

Furthermore the invention provides a novel system of automated local and remote communication, whereby information from multiple local storage units is gathered locally using optical infrared carriers, by a supervisory unit, and transmitted to remote vendors.

In a commercial embodiment, it is anticipated that vendors of medical products can either lease or own shelf units in a medical storage facility and will thus be enabled to maintain a proprietary presence physically within a specialty medical suite.

Various arrangements of shelves may be configured to accommodate a variety of products and sizes. Variations will include bottle dispensers, refrigerated items or temperature controlled products. The term "shelf" is used in a broad sense to describe any roughly horizontally extending member that can support product items in storage but it will be understood that such horizontal member is only one embodiment of a defining member for a product item storage volume and that other vertical, curved or otherwise geometrically differentiated defining members may be used, depending upon the configuration of the storage volume and the product items or material or materials stored therein.

As described in the preferred embodiments herein, electronic shelf unit 10 is designed to be an intelligent, self-contained unit that can easily be transported and installed on existing shelving without requiring major installation work, and specifically, without requiring any cable connections to other system components except for a power cable if the shelf unit is not battery powered. To this end, electronic shelf unit 10 has onboard intelligence provided by a suitably programmed and supported embedded microprocessor. Shelf 10 processes sensed data locally and makes local decisions as to what pixel information amounts to an addition or removal of an item or items from the shelf, transmitting externally, typically to a remote vendor, information as to what the shelf understands as inventory differences. This is a very convenient, practical unit easily accepted by prospective customers.

Modified embodiments can effect data processing remotely, whereby the shelf is a dumb sensing unit reporting pixel information to a remote processing center, or computer, for interpretation of inventory-movement information. Information from all the shelf units at a single facility may be processed centrally, or alternatively, a more localized computer may service a group of shelves.

INDUSTRIAL APPLICABILITY

The present invention is particularly suitable for application to modern industrial processes. In particular, to the medical supplies and equipment industries, and also more generally in any industry where physical inventory items are stocked or warehoused and more efficient inventory management and tracking of inventory movements is desired. The novel materials monitoring systems and methods of the invention can be beneficially applied in component-intensive industries such, for example, as the automotive, aircraft, electronics and instrumentation manufacturing industries and can be utilized both in the factory and the aftermarket. A wide range of other industrial and commercial applications will be apparent to those skilled in the relevant arts.

For example, it may be valuable for unattended dispensing of merchandise to identify card-carrying customers at locations such as hotels, resorts and clubs. Indeed, a remote reporting credit card reading terminal could be built in to electronics unit 34, or an equivalent thereof to provide access to the merchandise and at the same time bill the customer's account. Equally of course, resorts, hotels and the like may provide customers with their own house cards.

It is desirable to assist a customer present others withdrawing product items from shelves during the period that the customer has authorized withdrawals from that shelf by means of their credit card or other user ID, during which time that customer will be billed for any item withdrawn from the shelf unit.

It is therefore desirable to provide means to restrict access to shelf inventory while one customer is using it. It will be appreciated that for the foregoing uses, electronic shelf unit 10 may be embodied in an enclosed or substantially enclosed showcase with a transparent top or sides for viewing product items within the showcase. Such a showcase, for retail use may have a limited access cover ensuring that any one person at a time can gain access to product items stored in the showcase. In other circumstances access control can be provided by limiting the size of the shelf to, for example two or three feet in length, which size will fit many standard bays.

Other related embodiments that are especially suitable for unattended retail dispensing are automated vending machines wherein every item on the shelf is sensed and identified and wherein customers pay for items in advance by identifying themselves to the vending machine with a credit card or other identification prior to accessing the machine and removing desired product items. Such equipment is of particular value for merchandising higher value items such as items offered for sale in resort hotels, namely clothing, leather goods, moderate value jewelry and so on and so forth.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A materials monitoring system comprising:
   a) a traffic-sensing electronic product-storage unit having:
      i) a storage volume to store multiple materials product items arranged in side-by-side relationship;
      ii) a storage volume defining surface to extend along said side-by-side multiple product items when stored, said stored product items each having a spatial form projecting an outline onto said storage volume defining surface; and
      iii) an item activity-sensing subsystem continually to monitor the product items in the storage volume and produce a stored item activity output, said item activity-sensing subsystem including a sensing grid comprising an array of product item sensors distributed in relation to said storage volume defining surface so that each projected outline of a product item on the storage volume surface includes multiple sensors, each said sensor being responsive to the presence of a product item positioned in occluding relationship with the sensor to provide a sensor output, said multiple sensors providing sensor output pattern data indicative of said product item projected outline and useful for determining stored item activity; and
   b) a data-processing subsystem to process said sensor output pattern data for said multiple product items and generate product item activity information including product item withdrawal information;
whereby said materials monitoring system can automatically generate a product traffic report, including withdrawals of product items from said storage volume as said withdrawals are made.

2. A materials monitoring system according to claim 1 wherein the storage volume defining surface comprises a shelf intended for generally horizontal disposition, said product items project their form outline downwardly on to the shelf and are laterally movable on the shelf across individual sensors whereby adjacent sensors are added to or subtracted from the sensor output pattern data.

3. A materials monitoring system according to claim 2 wherein said item activity-sensing subsystem includes a grid-like array of pressure transducers subject to pressure from items in said storage volume, said array providing a series of co-ordinates whereby said footprint can be described in terms of said co-ordinates.

4. A materials monitoring system according to claim 2 wherein each sensor is a weight-sensitive, piezoelectric, capacitive sensor or a pressure transducer, and each stored item rests on multiple said sensors applying its weight thereto, whereby a compound weight and form pattern is generated.

5. A materials monitoring system according to claim 2 wherein the traffic-sensing electronic product-storage unit comprises a self-contained unit retrofittable on to an existing shelf and includes said data-processing subsystem and access control means requiring entry of an access code to remove a product item from said storage volume.

6. A system according to claim 1 comprising a sensing program stored in computer-readable media, said sensing program being capable of processing signals from said sensors to provide a map of the presence and location of each said stored item.

7. A system according to claim 6 wherein said program uniquely identifies each said stored product item by location and posts item identification information to storage when said product items are received into storage in said storage volume, whereby said item identification information is available to identify items removed from storage according to said storage volume location.

8. A system according to claim 6 wherein said scanner sequentially scans multiple subvolumes of said storage volume, to update said inventory map incrementally.

9. An electronic product-storage unit according to claim 1 wherein said product-storage unit is an elongated shelf unit and said storage volume extends along said shelf, said item-activity sensing means comprises a sensing grid extending along said shelf, said product items being intended to rest on said sensing grid.

10. An electronic product-storage unit according to claim 9 wherein said shelf unit is configured to fit within pre-existing facility shelf spaces.

11. A materials monitoring system according to claim 1 comprising an optical signalling infrared data communications transceiver communicator to communicate said product traffic report externally of said electronic product-storage unit, an infrared transceiver-equipped supervisory unit in line of sight communication with multiple said electronic product storage units, and relay station having data storage and forwarding means to report storage trait activity to a remote location.

12. A materials monitoring system according to claim 11 wherein said supervisory unit is intelligent, processor-equipped and equipped with optical signalling infrared transceivers and dedicated modems to constitute a communications relay station whereby the shelf supervisory unit can poll individual shelf units in response to remote requests or their own programming, and forward inventory movements reported by each shelf unit to a remote location.

13. A materials monitoring system according to claim 1 comprising an access control subsystem controlling withdrawal of said product items from said storage volume, said access control subsystem requiring entry of a withdrawal code to permit withdrawal of said product items, said data-processing subsystem being programmed to associate said withdrawal code with a respective withdrawn item in said product traffic report whereby said withdrawal code can be used to direct accounting for said withdrawn product item combine and expand 10–11.

14. A materials monitoring system according to claim 1 wherein the product items each bear a machine readable identifier code, the system includes an identifier code reader and the data processing subsystem includes means to associate a machine-read code with a storage volume location defined by multiple sensors.

15. A materials monitoring system according to claim 1 wherein each sensor comprises a radiant emitter directed into the storage volume coupled with a radiant detector to detect radiation reflected from a stored product item.

* * * * *